(12) United States Patent
Bailey

(10) Patent No.: US 11,570,872 B2
(45) Date of Patent: *Jan. 31, 2023

(54) EMERGENCY NOTIFICATION SYSTEM

(71) Applicant: Hubbell Lighting, Inc., Shelton, CT (US)

(72) Inventor: Christopher Lane Bailey, Greenville, SC (US)

(73) Assignee: Hubbell Lighting, Inc., Shelton, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/112,657

(22) Filed: Dec. 4, 2020

(65) Prior Publication Data
US 2021/0090417 A1    Mar. 25, 2021

Related U.S. Application Data

(63) Continuation of application No. 16/430,654, filed on Jun. 4, 2019, now Pat. No. 10,861,309.
(Continued)

(51) Int. Cl.
*H05B 47/155* (2020.01)
*G08B 21/02* (2006.01)
(Continued)

(52) U.S. Cl.
CPC ......... *H05B 47/155* (2020.01); *F21V 23/003* (2013.01); *G08B 7/06* (2013.01);
(Continued)

(58) Field of Classification Search
CPC ... F21V 23/003; F21Y 2115/10; G08B 19/00; G08B 27/00; G08B 29/00; G08B 5/36
See application file for complete search history.

(56) References Cited

U.S. PATENT DOCUMENTS

| 4,630,248 A | 12/1986 | Scott |
| 5,012,223 A | 4/1991 | Griebell et al. |

(Continued)

FOREIGN PATENT DOCUMENTS

| CN | 201993852 | 9/2011 |
| CN | 103605956 A | 2/2014 |

(Continued)

OTHER PUBLICATIONS

PCT International Search Report and Written Opinion for corresponding PCT Application No. PCT/US2019/035355, dated Aug. 16, 2019, 14 pages.
(Continued)

*Primary Examiner* — Omeed Alizada
(74) *Attorney, Agent, or Firm* — Michael Best & Friedrich LLP

(57) ABSTRACT

An emergency notification system for a building is provided. The emergency notification system includes one or more inputs devices mounted throughout the building. The one or more input devices can be configured to receive a manual user-input. The emergency notification system can include one or more output devices mounted throughout the building. The one or more output devices can include a plurality of LED arrays. Each of the plurality of LED arrays can be configured to emit light of a different color to indicate a different type of emergency. The emergency notification system can include one or more control devices configured determine a type of emergency occurring within the building based on the manual user-input. Furthermore, in response to determining the type of emergency, the one or more control devices can activate one of the LED arrays to emit light of a color indicative of the type of emergency.

20 Claims, 14 Drawing Sheets

Related U.S. Application Data

(60) Provisional application No. 62/680,108, filed on Jun. 4, 2018, provisional application No. 62/702,991, filed on Jul. 25, 2018, provisional application No. 62/821,666, filed on Mar. 21, 2019.

(51) Int. Cl.

| | | |
|---|---|---|
| *F21V 23/00* | (2015.01) | |
| *G08B 7/06* | (2006.01) | |
| *G08B 27/00* | (2006.01) | |
| *G08B 29/00* | (2006.01) | |
| *G08B 19/00* | (2006.01) | |
| *H05B 45/20* | (2020.01) | |
| *H05B 47/19* | (2020.01) | |
| *H05B 47/12* | (2020.01) | |
| *H05B 47/125* | (2020.01) | |
| *F21Y 113/13* | (2016.01) | |
| *F21Y 115/10* | (2016.01) | |

(52) U.S. Cl.
CPC ............. *G08B 19/00* (2013.01); *G08B 21/02* (2013.01); *G08B 27/00* (2013.01); *G08B 29/00* (2013.01); *H05B 45/20* (2020.01); *H05B 47/12* (2020.01); *H05B 47/125* (2020.01); *H05B 47/19* (2020.01); *F21Y 2113/13* (2016.08); *F21Y 2115/10* (2016.08)

(56) References Cited

U.S. PATENT DOCUMENTS

| | | | |
|---|---|---|---|
| 5,961,072 | A | 10/1999 | Bodle |
| 6,000,807 | A | 12/1999 | Moreland |
| 6,724,159 | B2 | 4/2004 | Gutta et al. |
| 7,619,366 | B2 | 11/2009 | Diederiks |
| 10,176,689 | B2* | 1/2019 | Ivey .................... G08B 7/06 |
| 2002/0057204 | A1* | 5/2002 | Bligh .................... G09F 19/22 340/691.1 |
| 2002/0135476 | A1 | 9/2002 | McKinney, Jr. et al. |
| 2009/0001891 | A1 | 1/2009 | Patterson |
| 2009/0091466 | A1 | 4/2009 | Sendrowski, Jr. |
| 2010/0327766 | A1 | 12/2010 | Recker et al. |
| 2011/0037606 | A1 | 2/2011 | Boise |
| 2011/0074578 | A1* | 3/2011 | Yablonowski ......... G06Q 30/06 340/541 |
| 2012/0002047 | A1 | 1/2012 | An et al. |
| 2012/0127308 | A1 | 5/2012 | Eldershaw et al. |
| 2014/0009301 | A1* | 1/2014 | Robotham ............... G08B 5/38 340/691.1 |
| 2014/0132164 | A1* | 5/2014 | McBryde ............... H05B 45/39 315/187 |
| 2014/0361886 | A1 | 12/2014 | Boyden et al. |
| 2015/0070166 | A1 | 3/2015 | Boyden et al. |
| 2016/0157032 | A1 | 6/2016 | Kane et al. |
| 2016/0232774 | A1 | 8/2016 | Noland et al. |
| 2016/0273722 | A1* | 9/2016 | Crenshaw .......... H05B 45/3725 |
| 2017/0161614 | A1* | 6/2017 | Mehta .................... G06N 20/00 |
| 2017/0164439 | A1* | 6/2017 | Reed ........................ F21V 9/20 |
| 2018/0040214 | A1* | 2/2018 | Rehfeld ........... G08B 13/19645 |
| 2018/0082685 | A1 | 3/2018 | Carlin et al. |
| 2018/0151034 | A1 | 5/2018 | Eddins et al. |

FOREIGN PATENT DOCUMENTS

| | | |
|---|---|---|
| CN | 103854419 | 6/2014 |
| CN | 204328749 | 5/2015 |
| CN | 107631258 | 1/2018 |

OTHER PUBLICATIONS

Chinese Patent Application No. 201980044628.8 First Office Action issued by the China National Intellectual Property Administration dated Nov. 1, 2021 (and translation).

Chinese Patent Office Action for Application No. 201980044628.2 dated Mar. 30, 2022 (15 pages including statement of relevance).

* cited by examiner

EMERGENCY NOTIFICATION SYSTEM

PRIORITY CLAIM

The present application is a continuation of U.S. application Ser. No. 16/430,654, filed Jun. 4, 2019, which is incorporated by reference in its entirety herein. The present application also claims the benefit of priority of U.S. Provisional App. No. 62/680,108, titled "Lighting System for Detecting an Emergency Condition," having a filing date of Jun. 4, 2018, which is incorporated by reference in its entirety herein. The present application also claims the benefit of priority of U.S. Provisional App. No. 62/702,991, titled "Lighting System for Detecting an Emergency Condition," having a filing date of Jul. 25, 2018, which is incorporated by reference in its entirety herein. In addition, the present application claims the benefit of priority of U.S. Provisional App. No. 62/821,666, titled "Lighting System for Detecting an Emergency Condition," having a filing date of Mar. 21, 2019, which is incorporated by reference in its entirety herein.

FIELD

The present subject matter relates generally to emergency notification systems.

BACKGROUND

Lighting fixtures (e.g., luminaires) using LEDs or other solid-state light sources continue to penetrate the lighting market due to the increased luminous efficacy of commercially available LED components. LED lighting systems can include one or more LED devices that become illuminated as a result of the movement of electrons through a semiconductor material. LED luminaires are desirable as they offer energy savings due to good luminous efficacy combined with the ability to precisely control light distribution patterns, which is of particular importance for certain lighting scenarios.

BRIEF DESCRIPTION

Aspects and advantages of embodiments of the present disclosure will be set forth in part in the following description, or may be learned from the description, or may be learned through practice of the embodiments.

One example aspect of the present disclosure is directed to an emergency notification system for a building. The emergency notification system can include one or more input devices mounted throughout the building. The one or more input devices configured to receive a manual user-input. The emergency notification system can further include one or more output devices mounted throughout the building. The one or more output devices can include a plurality of LED arrays. Each of the plurality of LED arrays can be configured to emit light of a different color to indicate a different type of emergency. The emergency notification system can further include one or more control devices configured to perform operations. The operations can include determining a type of emergency occurring within the building based, at least in part, on the manual user-input. In response to determining the type of emergency, the operations can further include activating an LED array of the plurality of LED arrays. The LED array activated can emit light of a color indicative of the type of emergency occurring within the building.

Another example aspect of the present disclosure is directed to a method of controlling operation of an emergency notification system for a building. The method can include obtaining, via an input device of the emergency notification system, a manual user-input. The method can further include determining, by one or more control devices, a type of emergency occurring within the building based, at least in part, on the manual user-input. Furthermore, in response to determining the type of emergency the method can further include activating, by one or more control devices, an LED array of a plurality of LED arrays on one or more output devices of the emergency notification system. Each of the plurality of LED arrays can be configured to emit light of a different color to indicate a different type of emergency occurring within the building.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION

Detailed discussion of embodiments directed to one of ordinary skill in the art are set forth in the specification, which makes reference to the appended figures, in which.

Figure 7:
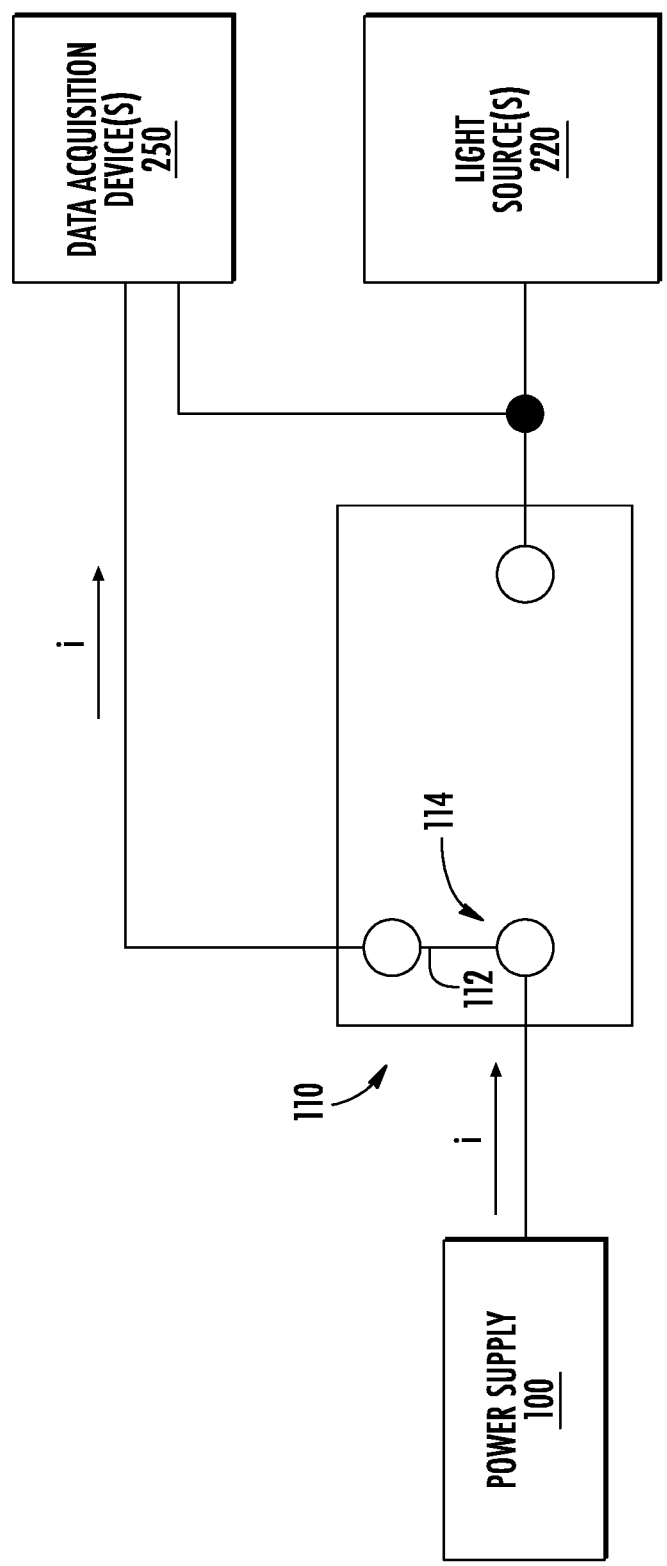
Figure 8:
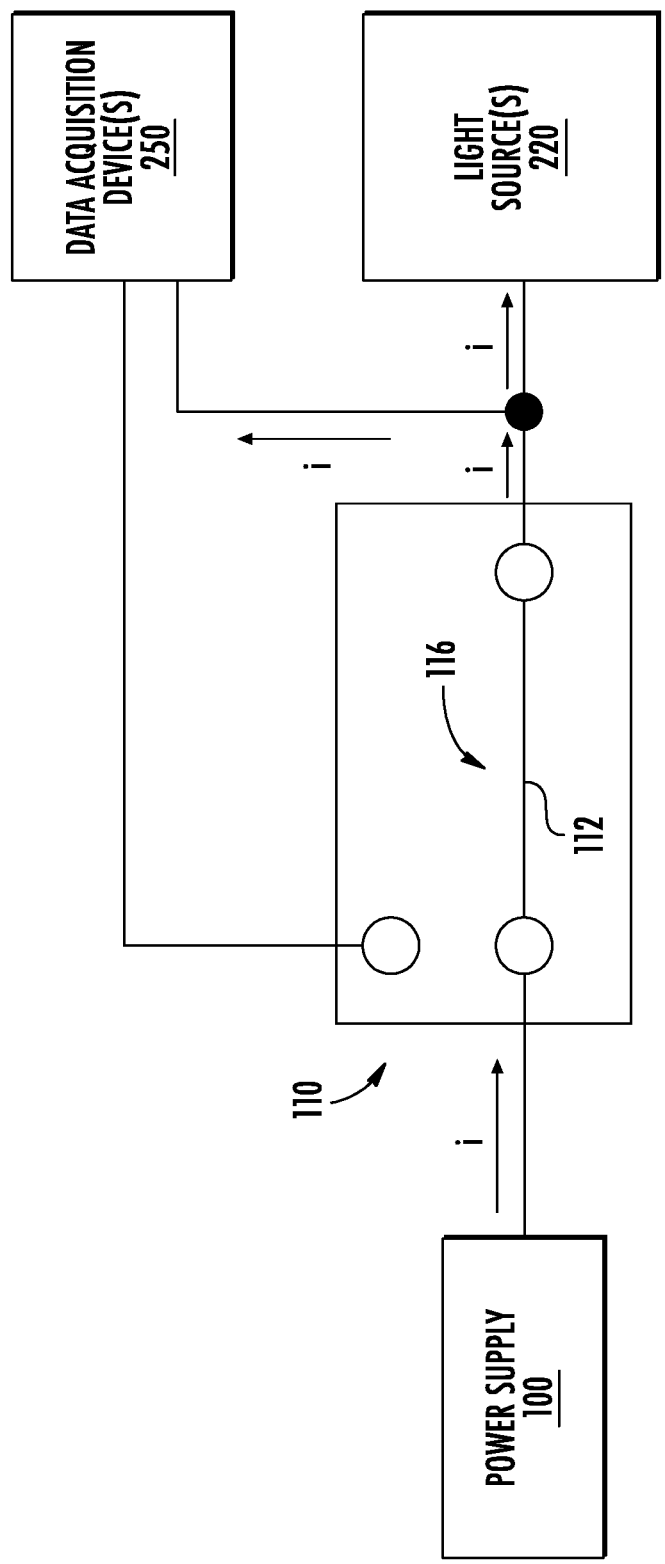
Figure 9:
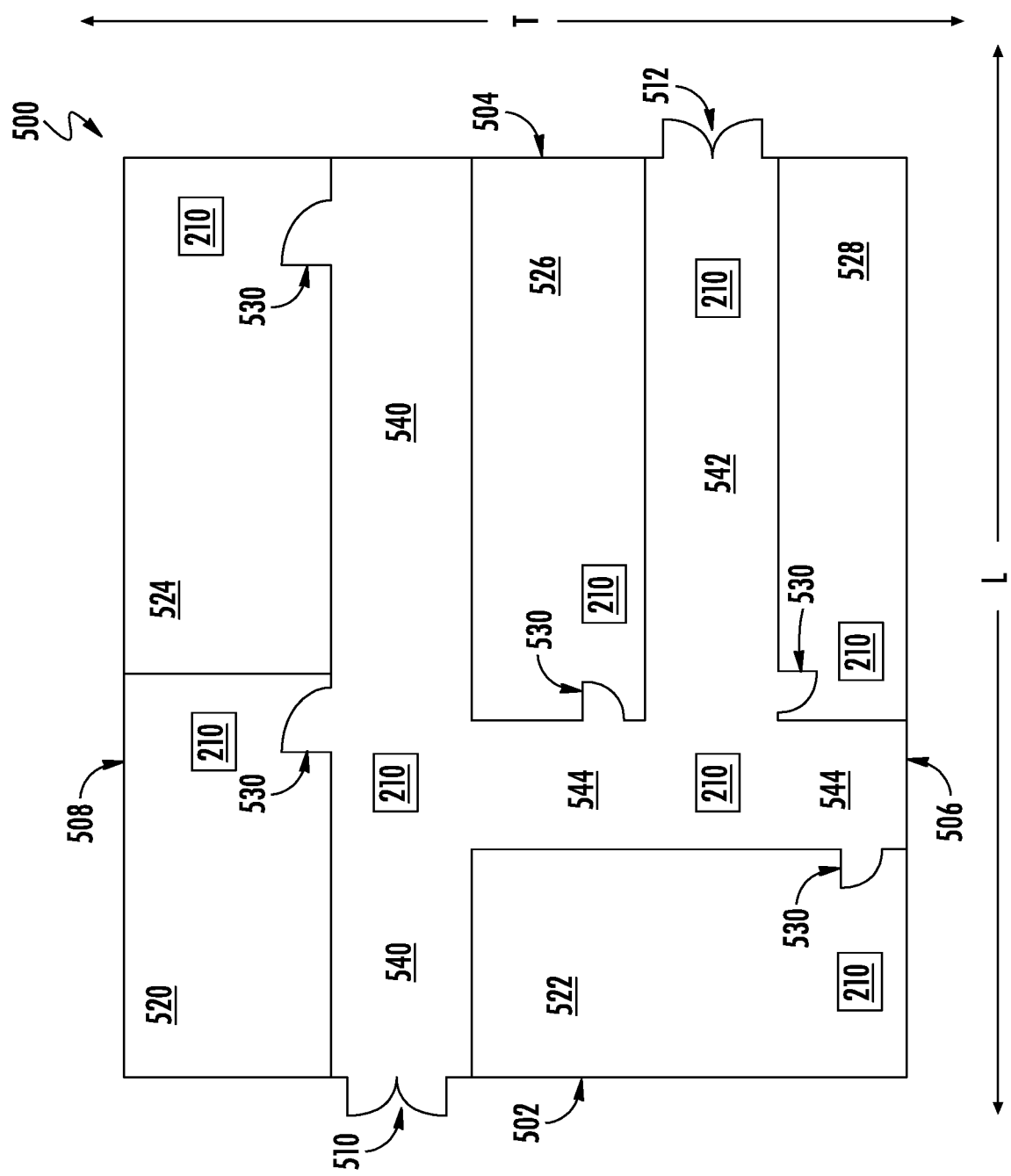
Figure 10:
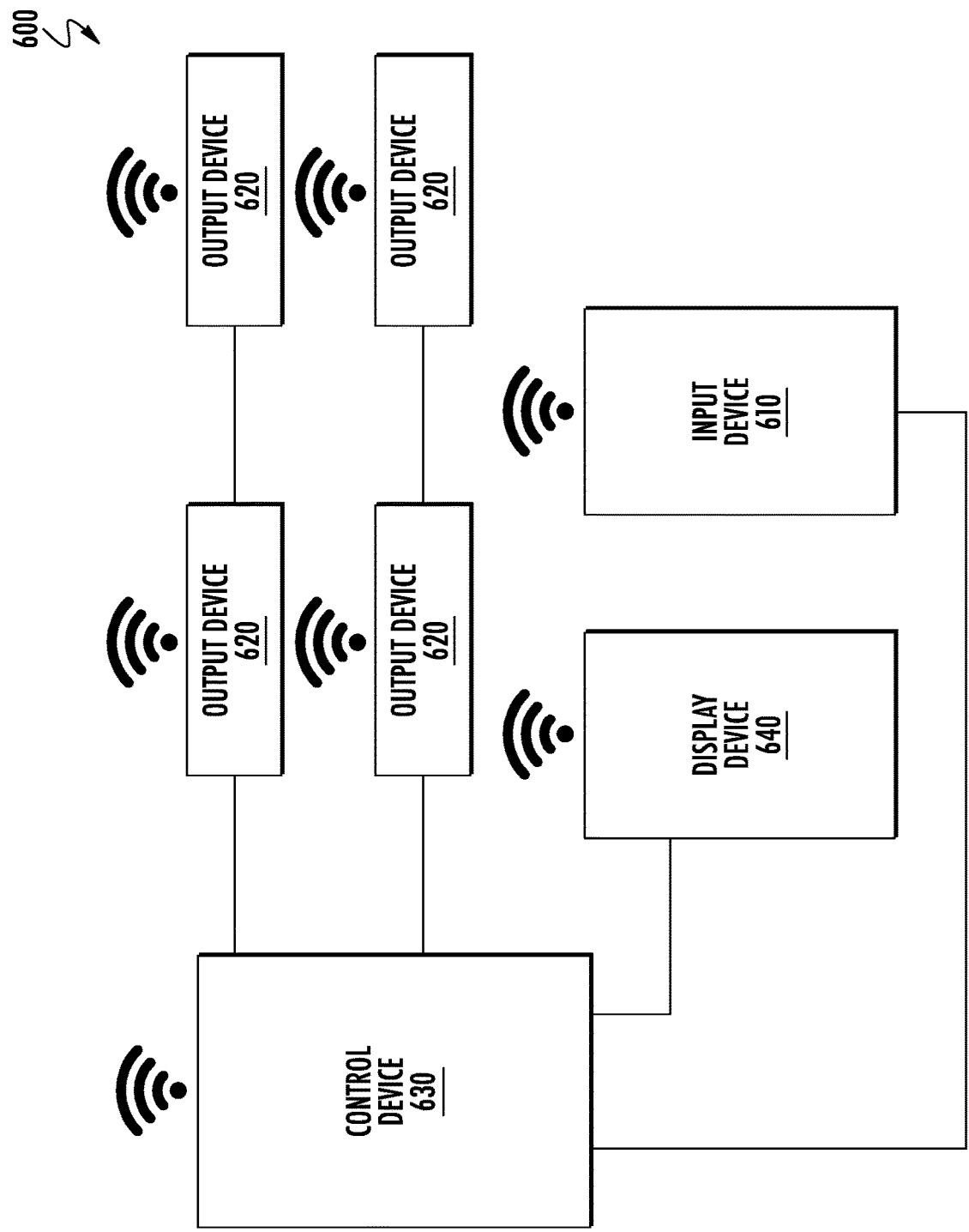
Figure 11:
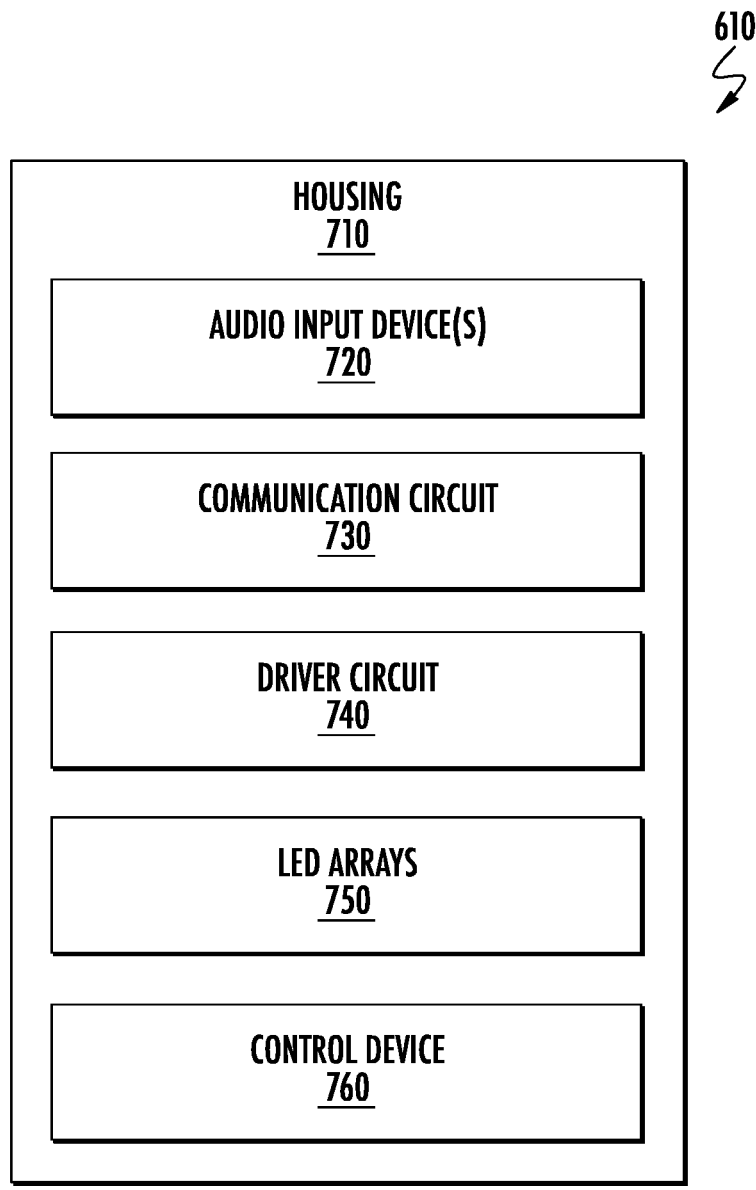
Figure 12:
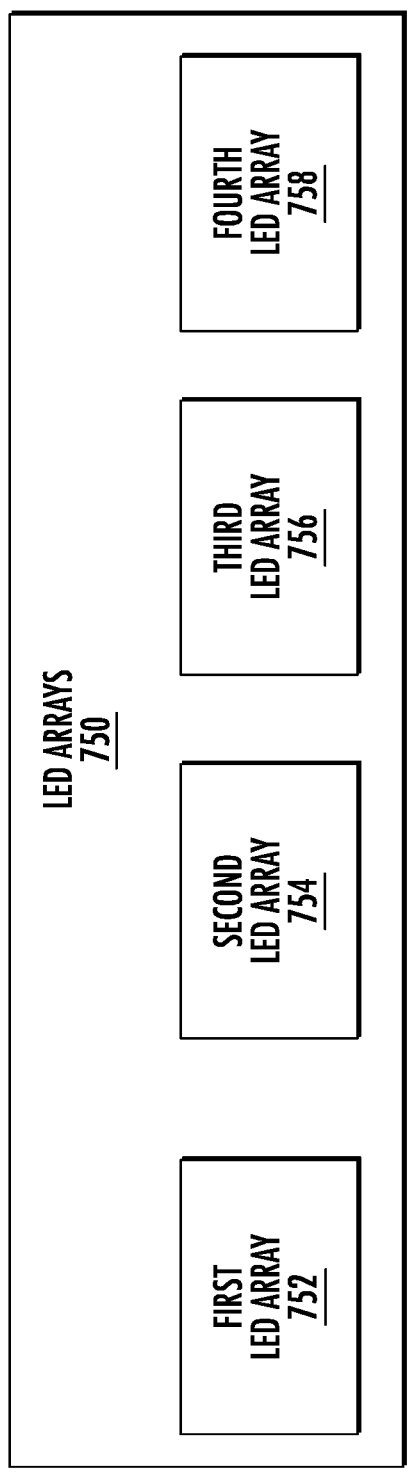
Figure 13:
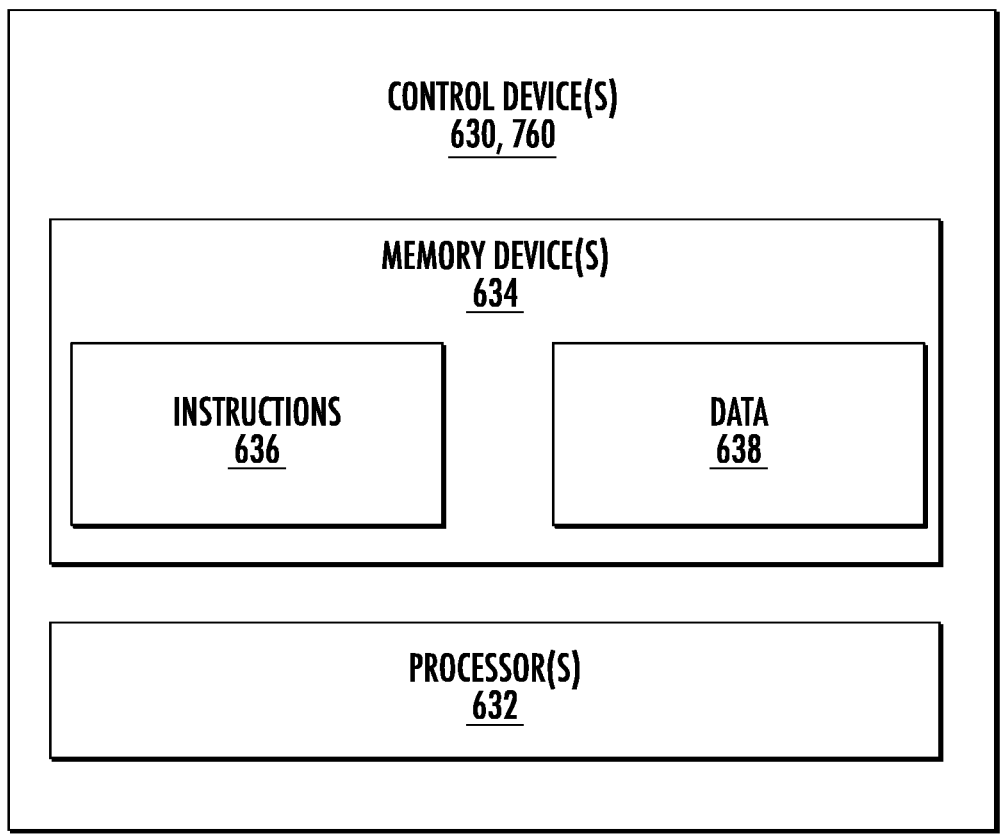
Figure 14:
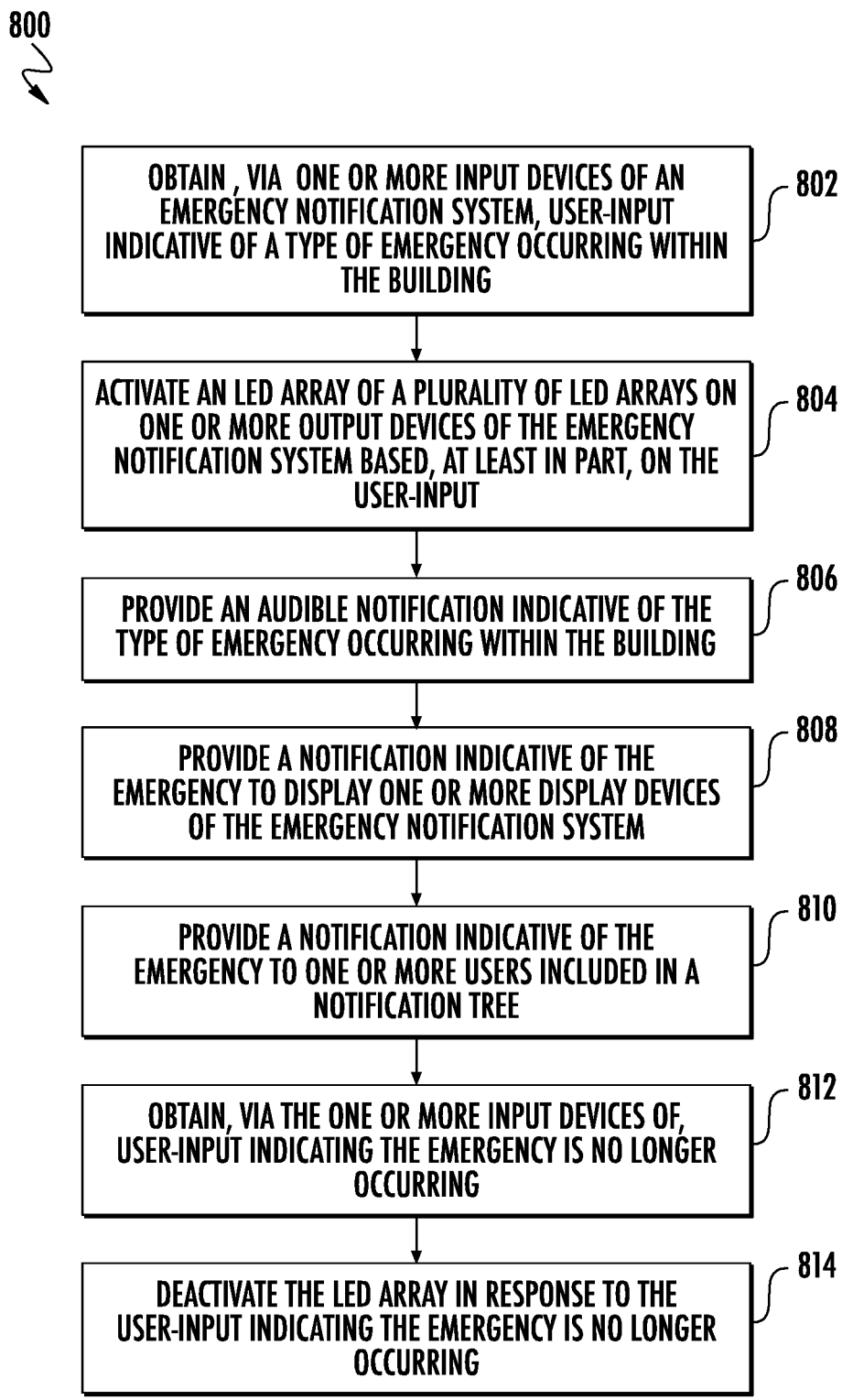

FIG. 7 provides a schematic of a circuit according to example embodiments of the present disclosure;

FIG. 8 provides a schematic of a circuit according to example embodiments of the present disclosure;

FIG. 9 depicts an environment in which a lighting system can be implemented according to example embodiments of the present disclosure;

FIG. 10 depicts a block diagram of components of an emergency notification system according to example embodiments of the present disclosure;

FIG. 11 depicts a block diagram of components of an output device of an emergency notification system according to example embodiments of the present disclosure;

FIG. 12 depicts LED arrays of an output device of an emergency notification system according to example embodiments of the present disclosure;

FIG. 13 depicts a block diagram of components of a control device according to example embodiments of the present disclosure; and FIG. 14 depicts a flow diagram of a method for controlling operation of an emergency notification system according to example embodiments of the present disclosure.

DETAILED DESCRIPTION

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Example aspects of the present disclosure are directed to a lighting system for a building or area. The lighting system can include one or more lighting fixtures. In some implementations, the one or more lighting fixtures can include one or more data acquisition devices configured to obtain (e.g. collect) data indicative of an emergency within the building or area. For example, the one or more data acquisition devices can include, without limitation, one or more microphones configured to collect audio data indicative of the emergency occurring within the building or area. Audio data indicative of an emergency can include, for instance, sounds associated with a gunshot, breaking glass, a fire (e.g., fire alarm), crowd noise, or any other suitable sound indicative of an emergency.

In some implementations, the lighting system can include one or more control devices. For instance, the one or more control devices can be associated with the one or more lighting fixtures. Alternatively, the one or more control devices can be remote relative to the one or more lighting fixtures. In some implementations, the one or more control devices can be configured to process data received from the one or more data acquisition devices. For instance, the one or more control devices can be configured to implement one or more data processing algorithms (e.g., video, audio, etc.) on data obtained from the one or more data acquisition devices. In this manner, the one or more control devices can determine whether the emergency is occurring within the building or area based, at least in part, on the data obtained from the one or more data acquisition devices.

In some implementations, the one or more lighting fixtures of the lighting system can include one or more light source. For example, the one or more lighting fixtures can include a first light source comprising one or more light emitting diodes (LEDs) and a second light source comprising one or more LEDs. In some implementations, a color and/or color temperature of light emitted by the first light source can be different than a color and/or color temperature of light emitted by the second light source. For example, the color of light emitted by the first light source can be red, whereas the color of light emitted by the second light source can be a different color (e.g., white, green).

In some implementations, the one or more control devices can provide one or more control signals in response to determining occurrence of an emergency within the building. For instance, the one or more control devices provide one or more control signals to control operation of the first light source, the second light source, or both. For example, the first light source of one or more lighting fixtures positioned along a path that does not allow one or more persons to safely evacuate the building can be activated to emit red light. Conversely, the second light source of one or more lighting fixtures positioned along a path that does allow the one or more persons to safely evacuate the building can be activated to emit green light. In this manner, the lighting system can assist (e.g., provide visual cues) the one or more persons during the emergency.

In some implementations, the one or more control devices can be configured to determine the closest exit to each lighting fixture. For instance, the one or more control devices can be configured to determine whether the closest exit to a corresponding lighting fixture is a predetermined distance from the emergency. In some embodiments, the predetermined distance is any room or area outside of a 360 degree circle indicative of a current location of the emergency. It should be appreciated that the predetermined distance can depend on the type of emergency and/or the layout of the building or area. For example, if the building has a basement and the emergency is currently located within the basement, a user located on the ground floor of the building may be far enough removed from the emergency. As such, the one or more control devices can be configured to direct the user to evacuate the building via one or more doors located on the ground floor. In some implementations, if the one or more control devices determine the emergency is negated (e.g. the weapon is determined to be out of ammunition, the weapon has jammed etc.) or the severity of the emergency has been downgraded, then the predetermined distance may be increased to provide additional paths (e.g., exits) for the user to traverse to evacuate the building.

In some implementations, the one or more control devices can, during the emergency, issue a command to lock or unlock one or more doors associated with building or area. For instance, the one or more control devices can issue the command to a locking mechanism associated with the one or more doors. In this manner, the one or more control devices can unlock one or more doors associated with a path that leads persons within the building away from the emergency.

In some implementations, the one or more control devices can be configured to lock or unlock doors within the building in response to detection of one or more phrases (e.g. "Lock the door", "Unlock the door") spoken by one or more persons within the building. Alternatively or additionally, the one or more control devices can be configured to lock or unlock doors within the building in response to user input received via one or more interactive panels located throughout the building. For instance, the interactive panels can include an output device (e.g., display) configured to display a status (e.g., locked or unlocked) of one or more doors within the building. Alternatively or additionally, the interactive panels can include an input device (e.g., button, switch, touchscreen, keypad, etc.) one or more persons can manipulate (e.g., pressed, touched, pulled, etc.) to lock or unlock the door.

In some implementations, the one or more control devices can be configured to identify a person attempting to unlock or lock a door. For instance, the person can be required to verify their identity via a password, retinal scan, fingerprint scan, or any other suitable method of identifying a person. In this manner, the one or more control devices can be configured to lock or unlock doors within the building or area only for authorized personnel.

In some implementations, the one or more control devices can be configured to control operation of an alarm system (e.g., security system, fire alarm system, etc.) associated with the building or area. For instance, the one or more control devices can be configured to control operation of the alarm system when data obtained from the one or more data acquisition devices of the lighting fixtures indicates occurrence of an emergency within the building or area. In some implementations, the one or more control devices can be configured to activate a fire alarm system associated within the building ore area when data obtained from the data acquisition devices indicates occurrence of a fire within the building or area. Additionally, the one or more control devices can be configured to provide a notification to emergency personnel (e.g., fireman). The notification can indicate a location of the emergency (e.g., fire) based, at least in part, on the data obtained from the one or more data acquisition devices. In this manner, emergency personnel can be notified of the location of the emergency.

In some implementations, the one or more control devices can be configured to control operation of an emergency lighting system associated with the building or area. For instance, the one or more control devices can be configured to control operation of the emergency lighting system when data obtained from the one or more data acquisition devices of the lighting fixtures indicates occurrence of an emergency within the building or area. In some implementations, the one or more control devices can be configured to activate one or more emergency lights of the emergency lighting system when data obtained from the data acquisition devices indicates a power outage has occurred within the building or area.

In some implementations, the emergency can be indicative of a fire within the building. For example, the audible sounds detected by the one or more microphones can include an audible alarm emitted by one or more smoke detectors within the building. Alternatively or additionally, the audible sounds detected by the one or more data acquisition devices can include one or more phrases (e.g., "Fire", "Smoke") spoken by a person within the building. In some implementations, the one or more control devices can be configured to control operation of the light sources of the lighting fixtures based, at least in part, on the audible sounds indicative of the fire. For instance, the one or more control devices can issue a command to illuminate the second light source of lighting fixtures positioned along a path one or more persons within the building can traverse to safely evacuate the building. Additionally, the control devices can issue a command to illuminate the first light source of lighting fixtures that are not positioned along the path. In this manner, the lighting system can provide visual cues (e.g., red light, green light) that can assist the one or more persons attempting to evacuate the building.

In some implementations, the emergency can be associated with an active shooter within the building. For instance, audible sounds detected by the one or more data acquisition devices of the one or more lighting fixtures can be indicative of a firearm being discharged (e.g., gunshot). Alternatively or additionally, the audible sounds detected by the one or more data acquisition devices can include one or more phrases (e.g., "Gun", "Shooter") spoken by a person within the building and indicative of an active shooting. In some implementations, the one or more control devices can control operation of the one or more light sources to provide an indicator (e.g., flashing red, etc.) of the emergency.

In some implementations, the one or more control devices can be configured to compare audio data obtained from the one or more data acquisition devices against audio data stored in a database and indicative of sounds (e.g., gunshot) associated with an emergency. For instance, the one or more control devices can compare audio data obtained from one or more microphones of the lighting system against the audio data stored in the database and indicative of a gunshot. In this manner, the one or more control devices can determine whether the audio data obtained from the one or more microphones corresponds to a firearm being discharged. In addition, the one or more control devices can be configured to ignore audio data obtained from one or more microphones of the lighting system that does not correspond to a firearm being discharged.

In some implementations, the one or more control devices can be configured to determine a location of the emergency based, at least in part, on data obtained from the one or more data acquisition devices associated with each of a plurality of lighting fixtures located throughout the building or area. For example, the one or more control devices can be configured to determine which of the plurality of lighting fixtures is closest to the emergency based, at least in part, on audio data obtained from one or more microphones associated with each of the lighting fixtures. In this manner, the one or more control devices can determine a current location of the emergency.

In some implementations, the one or more control devices can be configured to obtain data from the one or more data acquisition devices in real-time or near real-time to track movement of the emergency within the building. For instance, the one or more control devices can be configured to determine movement of the emergency from a first floor of the building to a second floor of the building based, at least in part, on a comparison of data obtained from data acquisition devices associated with one or more lighting fixtures on the first floor and second floor, respectively. In this manner, the one or more control devices can control operation of the light sources (e.g., first light source and second light source) based on movement of the emergency. For example, the one or more control devices can deactivate the second light source (e.g., green light) of a lighting fixture and activate the first light source (e.g., red light) when data obtained from the one or more data acquisition devices of the lighting fixture indicate the emergency is moving towards the lighting fixture.

In some implementations, the one or more control devices can provide one or more notifications indicative of the emergency to emergency personnel responding to the emergency. For instance, the one or more notifications can be provided to user devices (e.g., smartphone, tablet, etc.) associated with emergency personnel and can indicate a present location of the emergency and a path emergency personnel can traverse within the building or area to respond to the emergency. In some implementations, the one or more control devices can be configured to update the path emergency personnel can traverse based, at least in part, on movement of the emergency as determined by data obtained from the one or more data acquisition devices.

In some implementations, the lighting system can include both master and slave fixtures. It should be appreciated that the lighting system can include one or more master fixtures. In some implementations, the master fixtures may be placed according to the type of data acquisition devices located within each master fixture. In some implementations, slave fixtures may be lighting fixtures used in previous lighting systems used within the building. In some implementations, the slave lighting fixtures can be communicatively coupled with the master lighting fixtures. In this manner, the master lighting fixtures can control operation of the slave lighting fixtures during an emergency. For example, the master lighting fixtures can issue one or more commands associated with controlling operation of one or more light sources associated with the slave lighting fixtures.

In some implementations, each master fixture included in the lighting system may have different data acquisition devices. For instance, a first master fixture included in the lighting system may include one or more microphones. Conversely, a second master fixture included in the lighting system may include one or more optical sensors. Alternatively or additionally, the slave fixtures included in the lighting system may not include any data acquisition devices. In such implementations, the master lighting fixtures can control operation of the slave lighting fixtures based, at least in part, on data obtained from one or more data acquisition devices associated with the master lighting fixtures.

As used herein, a lighting system can include, but is not limited to, one or more of a lighting circuit, light engine, one or more luminaires, one or more lighting fixtures, one or more lighting units, a plurality of lighting devices arranged in an environment, a combination of any of the foregoing, or other lighting system.

Example aspects of the present disclosure are directed to emergency notification systems for a building. Emergency notification systems can include one or more input devices configured to receive a manual user-input. In some implementations, the one or more input devices can include any suitable type of touch-based input device (e.g., button, switch, touchscreen). In this manner, a user can provide the manual user-input via any suitable type of touch-based interaction with the touch-based input device. In some implementations, the one or more input devices can include any suitable type of touch-free input device (e.g., microphone, touch-free display). In this manner, a user can provide the manual user-input via any suitable type of touch-free interaction with the touch-free input device.

The emergency notification system can include one or more output devices mounting throughout the building. Furthermore, the one or more output devices 620 can be separate from one or more lighting fixtures located within the building and configured to illuminate an interior of the building. As will be discussed below in more detail, the one or more output devices can include a plurality of LED arrays, and each of the plurality of LED arrays can be configured to emit light of a different color (e.g., red, green, blue, white) to indicate a type of emergency (e.g., fire, active shooter, medical trauma) occurring within the building. As used herein, the term "color" can include any suitable color associated with a point on a chromaticity diagram. In addition, the use of the term "color" can include any suitable color temperature of light.

In some implementations, the plurality of LED arrays can include a first LED array, a second LED array, a third LED array, and a fourth LED array. The first LED array can be configured to emit light of a first color (e.g., red light) to indicate a first type of emergency (e.g., fire) occurring within the building. The second LED array can be configured to emit light of a second color (e.g., green) that is different than the first color and indicative of a second type of emergency (e.g., medical) occurring within the building that is different than the first type. The third LED array can be configured to emit light of a third color (e.g., blue) that is different than the first color and the second color. Furthermore, the third color can indicate a third type of emergency occurring within the building that is different than the first type and the second type.

In some implementations, the emergency notification system can include one or more control devices. The one or more control devices can be in communication with the one or more input devices over a network. In this manner, the one or more control devices can obtain the manual user-input provided via the one or more input devices. The one or more control devices can be configured to determine a type of emergency occurring within the building based, at least in part, on the manual user-input provided. As will be discussed below in more detail, the one or more control devices can be further configured to provide one or more control signals associated with activating one of the plurality of LED arrays on the one or more output devices to indicate the type of emergency occurring within the building.

As an example, the one or more control devices can be configured to provide one or more control signals associated with activating the first LED array of the one or more output devices in response to determining the type of emergency occurring within the building corresponds to the first type (e.g., fire). In this manner, the first LED array of the one or more output devices can emit light of the first color (e.g., red) to indicate the emergency occurring within the building is of the first type. As another example, the one or more control devices can be configured to provide one or more control signals associated with activating the second LED array of the one or more output devices in response to determining the type of emergency occurring within the building corresponds to the second type (e.g., medical). In this manner, the second LED array can emit light of the second color to indicate the emergency occurring within the building is of the second type. As yet another example, the one or more control devices can be configured to provide one or more control signals associated with activating the third LED array of the one or more output devices in response to determining the type of emergency occurring within the building corresponds to the third type (e.g., police). In this manner, the third LED array can emit light of the third color to indicate the emergency occurring within the building is of the third type.

In some implementations, the one or more control devices can provide one or more notifications indicative of the emergency occurring within the building to the one or more display devices of the emergency notification system. In this manner, the one or more notifications can be displayed on the display screens of the one or more or more display devices. In some implementations, the one or more notifications provided to the one or more display devices can indicate a location (e.g., floor and/or room) of the emergency occurring within the building. Furthermore, in some implementations the one or more notifications provided to the one or more display devices can include directions for emergency personnel responding to the emergency. More specifically, the one or more notifications displayed on the display screen of the one or more display devices can be a map of the building and can indicate a path emergency personal can traverse to respond to the emergency. In this manner, the one or more notifications displayed on the display screen of the one or more display devices can improve response time of emergency personnel responding to the emergency. In some implementations, the one or more control devices can be configured to provide one or more notifications to the one or more display devices in real-time or near real-time. In this manner, the notifications can be updated in real-time or near real-time to indicate a state (e.g., ongoing, all clear, etc.) of the emergency.

In some implementations, the one or more control devices can be configured to provide notifications indicative of the emergency occurring within the building to one or more persons included in a notification tree. For example, emergency personnel (e.g., police, fire, medical) can be included in the notification tree. Alternatively or additionally, security personnel for the building can be included in the notification tree. It should be appreciated, however, that any suitable person can be included in the notification tree. For example, if the building is a multi-premises building, tenants of the multi-premises building can be included in the notification tree.

In some implementations, the one or more control device can be configured to provide a notification (e.g., phone call, text message, e-mail, etc.) to emergency personnel (e.g., police dept., EMTs, fire dept.). Alternatively and/or additionally, the one or more control devices can be configured to provide a notification to local security for the building. For instance, the one or more control devices can be configured to email an account associated with the local security. Alternatively and/or additionally, the control device can be configured to call a phone number associated with the local security and provide a pre-recorded message indicative of the emergency. In this manner, multiple people can receive notifications indicative of the emergency occurring within the building.

The emergency notification system according to the present disclosure can provide numerous technical benefits. For instance, the one or more output devices can be used to indicate the type of emergency occurring within the building, because each of the plurality of LED arrays onboard the one or more output devices is configured to emit light of a different color to indicate a different type of emergency. In this manner, one or more persons within the building can determine the type of emergency occurring within the building based, at least in part, on the color of light emitted from the one or more output devices. In addition, each of the plurality of LED arrays onboard the one or more output devices can be configured to emit light according to different blinking patterns. In this manner, one or more persons that are colorblind and present within the building can determine the type of emergency based, at least in part, on the blinking pattern of the light being emitted from the one or more output devices.

In some implementations, a lighting fixture for a building can include a first LED array and a second LED array. The first LED array can be configured to emit light of a first color. The second LED array can be configured to emit light of a second color that is different than the first color. The lighting fixture can include one or more data acquisition devices. The lighting fixture can further include one or more control devices. The one or more control devices can be configured to obtain data from the one or more data acquisition devices. In addition, the one or more control devices can be configured to determine presence of an emergency within the building based, at least in part, on the data. The one or more control devices can be further configured to provide one or more control signals associated with activating the first LED array or the second LED array in response to determining presence of the emergency.

In some implementations, the one or more data acquisition devices can include one or more audio input devices configured to obtain audio data. The audio data can be indicative of audible noise associated with a firearm being discharged within the building.

In some implementations, the one or more control devices can be configured to provide one or more control signals associated with locking or unlocking one or more doors associated with the building in response to determining presence of the emergency within the building. In some implementations, the one or more control devices can be configured to provide one or more control signals associated with controlling operation of one or more image capture devices in response to determining presence of the emergency.

In some implementations, the one or more data acquisition devices can include one or more image capture devices. The one or more image capture devices can be configured to obtain one or more images depicting at least a portion of a room or area in which the lighting fixture is located. In some implementations, the one or more images can depict presence of a gunman within the room or area of the building. In such implementations, the one or more control signals can be associated with activating the first LED array of the lighting fixture to emit light of the first color to indicate presence of the emergency within the room or area of building.

In response to determining presence of the emergency within the room or area based, at least in part, on the one or more images, the one or more control devices can be further configured to provide one or more control signals associated with activating the first LED array or the second LED array on at least one other lighting fixture within the building.

In some implementations, a lighting system for a building can include a plurality of data acquisition devices. The lighting system can further include a plurality of lighting fixtures. Each of the plurality of lighting fixtures can include a first LED array and a second LED array. The first LED array can be configured to emit light of a first color. The second LED array can be configured to emit light of a second color that is different than the first color. The lighting system can further include one or more control devices. The one or more control devices can be configured to obtain data from one or more of the plurality of data acquisition devices. The one or more control devices can be further configured to determine presence of an emergency within the building based, at least in part, on the data. The one or more control devices can be configured to provide one or more control signals associated with activating the first LED array or the second LED array in response to determining presence of the emergency.

In some implementations, the plurality of data acquisition devices can include at least one of an audio input device and an image capture device. In some implementations, the data can include audio data obtained from the audio input device. In such implementations, the one or more control devices can be configured to determine a location of the emergency within the building based, at least in part, on the audio data. The one or more control devices can be further configured to provide the one or more control signals to activate the first LED array or the second LED array of each of the plurality of lighting fixtures based, at least in part, on the location of the emergency.

In some implementations, the one or more control devices can be configured to provide one or more control signals associated with locking or unlocking one or more doors associated with the building based, at least in part, on the location of the emergency.

Figure 1:
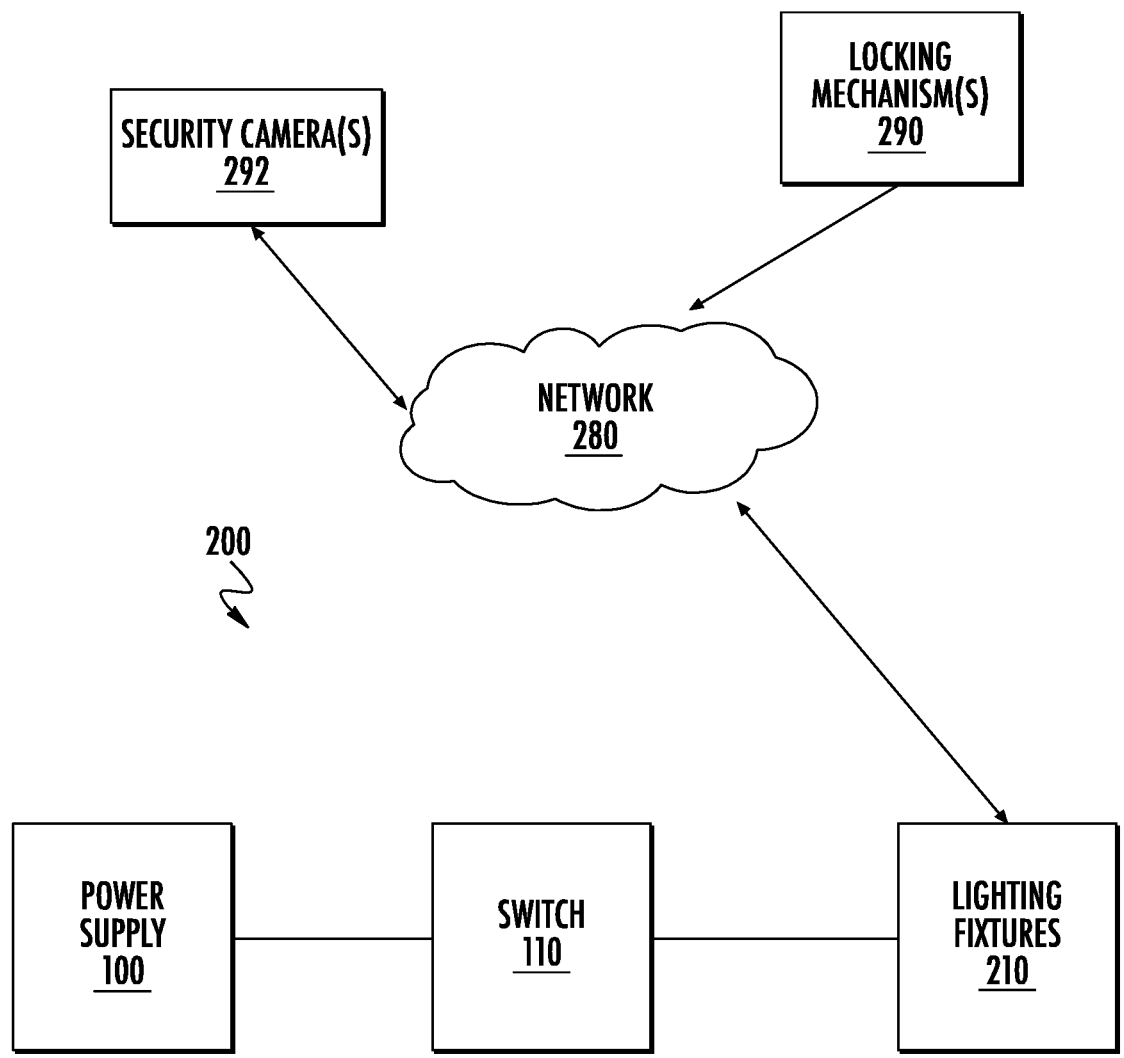
FIG. 1 depicts a block diagram of a lighting system according to example embodiments of the present disclosure.

Referring now to FIG. 1, a block diagram of a lighting system 200 is provided according to example embodiments of the present disclosure. The lighting system 200 can include a plurality of lighting fixtures 210 (only one shown). It should be appreciated that the lighting fixtures 210 can be installed within any suitable building. For instance, in some implementations, the lighting fixtures 210 can be installed within a room or area (e.g., hallway) of an office complex. As another example, the lighting fixtures 210 can be located within a room or area of a school.

In some implementations, the lighting fixtures 210 can be selectively coupled to a power supply 100 (e.g., mains power supply) via a switch 110. As an example, the switch 110 can be an in-wall switch configured to control operation of the lighting fixtures 210. For instance, the switch 110 can be a single pole single throw (SPST) switch movable between a first position and a second position. When a user moves the switch 110 to the first position, the lighting fixtures 210 are not in electrical communication with the power supply 100. In contrast, when a user moves the switch 110 to the second position, the lighting fixtures 210 are in electrical communication with the power supply 100. In this manner, the user can selectively couple the lighting fixture 210 to the power supply 100 via the switch 110.

Figure 2:
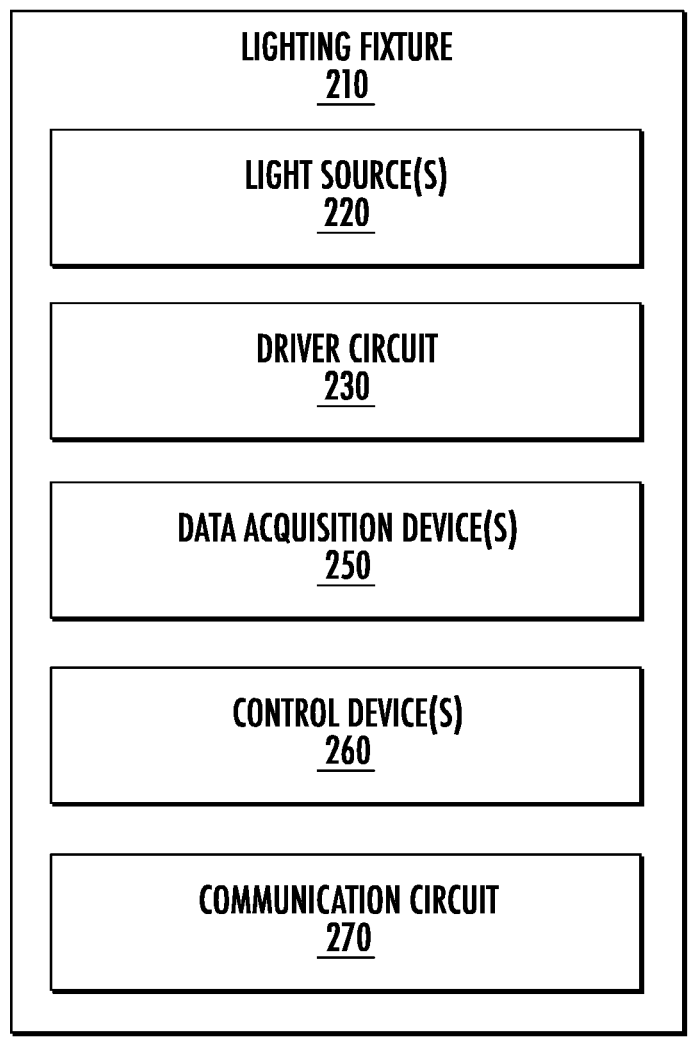
FIG. 2 depicts an example lighting fixture of a lighting system according to example embodiments of the present disclosure.
Figure 3:
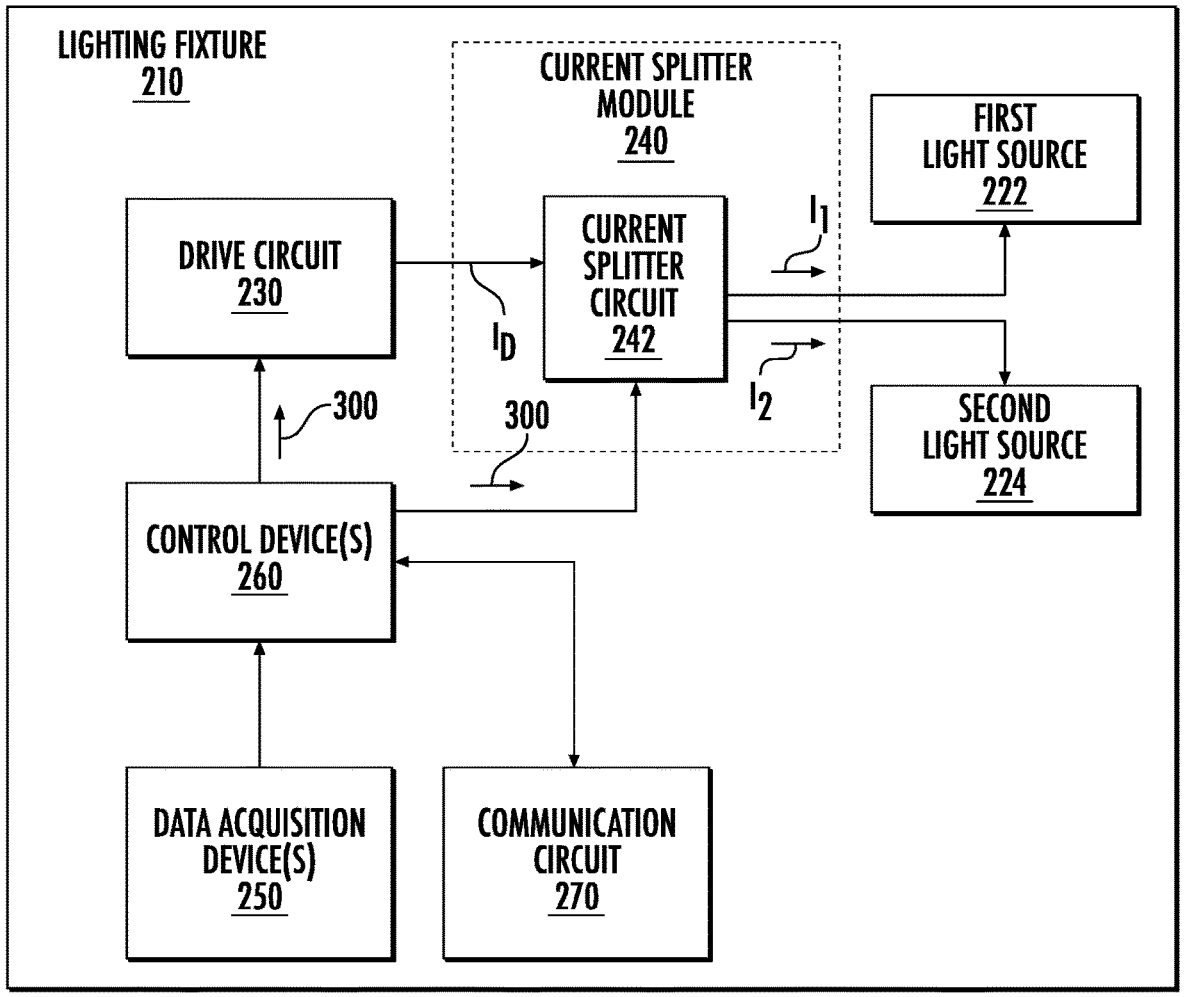
FIG. 3 depicts an example light fixture of a lighting system according to example embodiments of the present disclosure.
Figure 4:
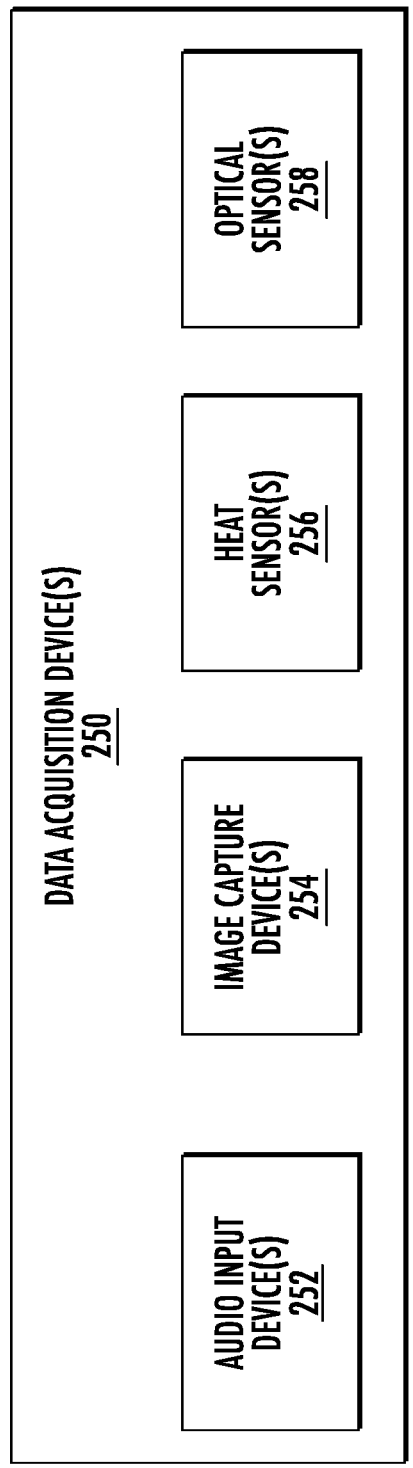
FIG. 4 depicts data acquisition devices of a lighting fixture according to example embodiments of the present disclosure.

Referring now to FIGS. 2 through 4, a block diagram of components of one of the lighting fixtures 210 is provided according to example embodiments of the present disclosure. As shown, each lighting fixture 210 can include one or more light sources 220 configured to illuminate a room or area in which the light fixture 210 is located. In some implementations, the one or more light sources 220 can include a first light source 222 and a second light source 224. The first light source 222 can include a first array of LEDs. Alternatively or additionally, the second light source 224 can include a second array of LEDs. Aspects of the present disclosure can be used with other suitable light sources without deviating from the scope of the present disclosure.

In some implementations, a color and/or color temperature of light emitted by the first light source 222 can be different compared to a color and/or color temperature of light emitted by the second light source 224. For instance, the color of light emitted by the first light source 222 can correspond to red light. Conversely, the color of light emitted by the second light source 224 can correspond to white light. It should be appreciated, however, that the color of light emitted by the first light source 222 and the second light source 224, respectively, can correspond to any suitable color of light. For instance, in some implementations, the color of light emitted by the second light source 224 can correspond to green light. As will be discussed below in more detail, the light source(s) 220 can provide visual cues (e.g., red light, green light) during an emergency (e.g., fire, gunman, etc.) within the building.

It should be appreciated that aspects of the present disclosure are discussed with reference to first light source 222 and the second light source 224 having different color and/or color temperature for purposes of illustration and discussion. The first light source 222 and the second light source 224 can each include any other suitable variations without deviating from the scope of the present disclosure. For instance, the first light source 222 and the second light source 224 can be associated with a different brightness, different lighting direction, different layout, or other suitable characteristics. Alternatively or additionally, the first light source 222 and the second light source 224 can be implemented on the same circuit board or on different circuit boards.

In some implementations, the lighting fixtures 210 can include a driver circuit 230. The driver circuit 230 can be configured to receive alternating current (AC) input power from the power supply 100 (FIG. 1) and convert the AC input power to a driver output ID (e.g., driver current) suitable for powering the one or more light sources 220. The driver circuit 230 can include various components, such as switching elements (e.g., transistors). Gate timing commands can be provided to the one or more switching elements to convert the AC input power to the driver current $I_D$.

In some implementations, the lighting fixtures 210 can each include a current splitter module 240 that is separate from the driver circuit 230. For instance, the current splitter module 240 can be coupled between the driver circuit 230 and the light source(s) 220 via one or more conductors (e.g., wires). As will be discussed below in more detail, the current splitter module 240 can be configured to split the driver current $I_D$ between the first light source 222 and the second light source 224.

In some implementations, the current splitter module 240 can include a current splitter circuit 242. The current splitter circuit 242 can include one or more control devices (e.g., a microprocessor, a microcontroller, logic device, etc.) and one or more switching elements (e.g., transistors) in line with each of the first light source 222 and the second light source 224. The control device(s) of the current splitter circuit 242 can control the amount of current provided to the first light source 222 and the second light source 224 by controlling the switching elements. For instance, the switching elements used to control the amount of current provided to the first light source 222 and the second light source 224 can be either on the low voltage side of both the first light source 222 and the second light source 224 or the high voltage side of both the first light source 222 and the second light source 224.

In some implementations, the current splitter circuit 242 can be configured to convert the driver output ID into a first current $I_1$ for powering the first light source 222 (e.g., first LED array) and a second current $I_2$ for powering the second light source 224 (e.g., second LED array). In this manner, the current splitter circuit 242 can be used to adjust the lumen output of the first light source 222 relative to the lumen output of the second light source 224. More specifically, the current splitter circuit 242 can be configured to control the ratio of the first current $I_1$ and the second current $I_2$.

In some implementations, the lighting system 200 can include one or more data acquisition devices 250. As shown, in some implementations, one or more of the lighting fixtures 210 can include the data acquisition device(s) 250. It should be appreciated however that, in some implementations, the data acquisition device(s) 250 can be separate from the lighting fixtures 210. In some implementations, the data acquisition device(s) 250 can include one or more audio input devices 252 (e.g., microphones) configured to detect audible sounds occurring within a room or area in which the lighting fixture 210 is located. It should be appreciated that the audio input device(s) 252 can convert the audible sounds to electrical signals indicative of the audible sounds. As will be discussed below in more detail, the audible sounds detected by the audio input device(s) 252 can indicate occurrence of an emergency (e.g., fire, gunman, etc.) within the room or area in which the lighting fixture 210 is located.

In some implementations, the data acquisition device(s) 250 can include one or more image capture devices 254 (e.g., cameras) configured to capture one or more images depicting the room or area in which the lighting fixture 210 is located. In this manner, the image capture device(s) 254 can obtain data indicative of presence of one or more persons in the room or area. As will be discussed below in more detail, the one or more images captured by the image capture device(s) 254 can indicate occurrence of an emergency (e.g., fire, gunman, etc.) with the room or area in which the lighting fixture 210 is located.

In some implementations, the data acquisition device(s) 250 can include one or more heat sensors 246 configured to obtain data indicative of a heat source within the room or area. For instance, in some implementations, the heat sensor(s) 256 can obtain data indicative of a firearm (e.g., heat source) being discharged within the room or area in which the lighting fixture 210 is located. As such, the data indicative of a heat source can indicate occurrence of an emergency within the room or area.

In some implementations, the data acquisition device(s) 250 can include one or more optical sensors 258. The one or more optical sensors 258 can detect data indicative of infrared light within the room or area in which the lighting fixture 210 is located. In some implementations, the data indicative of infrared light can indicate occurrence of an emergency within the room or space in which the lighting fixture 210 is located.

Figure 5:
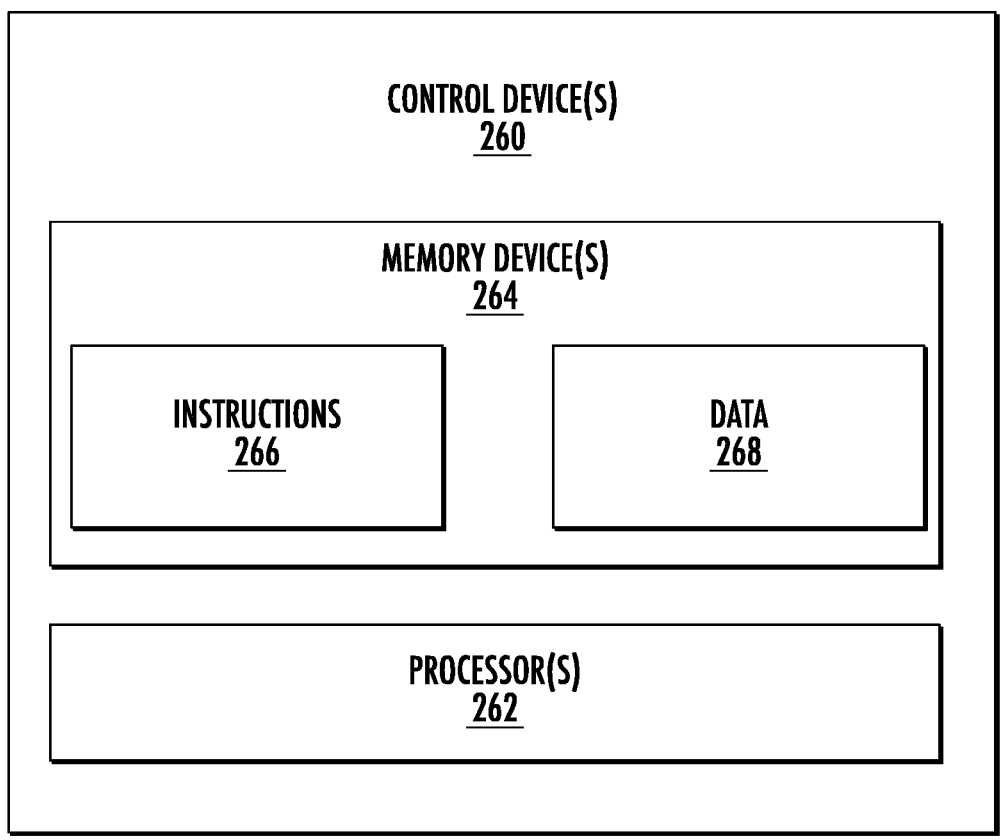
FIG. 5 depicts a block diagram of components of a control device according to example embodiments of the present disclosure.

In some implementations, the lighting fixture 210 can include one or more control devices 260. FIG. 5 illustrates one embodiment of suitable components of the control device(s) 260. As shown, the control device(s) 260 can include one or more processors 262 configured to perform a variety of computer-implemented functions (e.g., performing the methods, steps, calculations and the like disclosed herein). As used herein, the term "processor" refers not only to integrated circuits referred to in the art as being included in a computer, but also refers to a controller, microcontroller, a microcomputer, a programmable logic controller (PLC), an application specific integrated circuit (ASIC), a Field Programmable Gate Array (FPGA), and other programmable circuits.

In some implementations, the control device(s) 260 can include a memory device 264. Examples of the memory device 264 can include computer-readable media including, but not limited to, non-transitory computer-readable media, such as RAM, ROM, hard drives, flash drives, or other suitable memory devices. The memory device 264 can store information accessible by the processor(s) 262, including computer-readable instructions 266 and data 268. The computing-readable instructions 266 can be executed by the processor(s) 262. The computer-readable instructions 266 can be software written in any suitable programming language or can be implemented in hardware. In some implementations, the data 268 can include audio data indicative of one or one more sounds (e.g., car backfiring, etc.). In some implementations, the control device(s) 260 can be configured to compare audio data obtained from the audio input device(s) 252 to the data 268 stored in the memory device 264 to determine whether an emergency (e.g., active shooting) is occurring within the building.

In some implementations, the computer-readable instructions 266 can, when executed by the processor(s) 262, cause the processor(s) 262 to perform operations, such as determining occurrence of an emergency with the room or space based, at least in part, on data obtained from the data acquisition device(s) 250. Alternatively or additionally, the computer-readable instructions 266 can, when executed by the processor(s) 262, cause the processor(s) 262 to perform operations, such as providing one or more control signals associated with controlling operation of the lighting fixture 210 during an emergency.

In some implementations, the lighting fixture 210 can include a communication circuit 270. In example embodiments, the communications circuit 270 can include associated electronic circuitry that can be used to communicatively couple the control device(s) 260 with one or more remote devices (e.g., other lighting fixtures within the building, locking mechanism, alarm system, etc.). For instance, the communication circuit 270 can allow the control device(s) 260 to communicate directly with the one or more remote devices. Alternatively, the communication circuit 270 can provide for communication with the one or more remote devices over a network 280.

In some embodiments, the lighting fixture 210 can communicate with other lighting fixtures in a space (e.g., a room) over a network 280 (FIG. 1). The network 280 can be any suitable type of network, such as a Power-Over-Ethernet (POE) network, a local area network (e.g., intranet), a wide area network (e.g., internet), a low power wireless network (e.g., Bluetooth Low Energy (BLE), Zigbee, etc.), or some combination thereof and can include any number of wired or wireless links. In general, communication over the network 280 can be implemented via any type of wired or wireless connection, using a wide variety of communication protocols, encodings or formats, and/or protection schemes.

Example communication technologies used in accordance with example aspects of the present disclosure can include, for instance, Bluetooth low energy, Bluetooth mesh networking, near-field communication, Thread, TLS (Transport Layer Security), Wi-Fi (e.g., IEEE, 802.11), Wi-Fi Direct (for peer-to-peer communication), Z-Wave, Zigbee, Halow, cellular communication, LTE, low-power wide area networking, VSAT, Ethernet, MoCA (Multimedia over Coax Alliance), PLC (Power-line communication), DLT (digital line transmission), Power over Ethernet, etc. Other suitable wired and/or wireless communication technologies can be used without deviating from the scope of the present disclosure.

In some implementations, the control device(s) 260 can provide one or more control signals in response to determining occurrence of an emergency based, at least in part, on data obtained from the data acquisition device(s) 250. In example embodiments, the data obtained from the data acquisition device(s) 250 can include audio data indicative of the presence of a fire within the building. Alternatively or additionally, the data obtained from the data acquisition device(s) 250 can include audio data indicative of a gunman within the building.

In some implementations, the control device(s) 260 can provide one or more control signals associated with controlling operation of one or more lighting fixtures 210 during the emergency. For instance, the one or more control signals provided by the control device(s) 260 of the light fixture 210 can be associated with controlling operation of the first light source 222 and/or second light source 224 associated with each lighting fixture 210 in the lighting system 200. More specifically, the one or more control signals can be associated with illuminating the first light source of one or more lighting fixtures 210, the second light source of one or more lighting fixtures 210, or both. In this manner, one or more persons located within the building can be notified of the emergency.

In some implementations, the control device(s) 260 can issue a control signal 300 to the driver circuit 230 during the emergency to adjust the lumen output of the first light source 222 (FIG. 3) so that the first light source 222 emits pulses of light at a predetermined frequency during the emergency. Alternatively or additionally, the control device(s) 260 can issue a control signal to the driver circuit 230 to adjust the lumen output of the second light source 224 so that the second light source 224 emits pulses of light (e.g., green light) at a predetermined frequency during the emergency. In this manner, the lighting system 200 can provide visual cues (e.g., flashing red light, flashing green light) to one or more persons present in the building during the emergency. As will be discussed below in more detail, the visual cues provided by the first light source 222 and/or the second light source 224 can, in example embodiments, be used to indicate a path the one or more persons can traverse to evacuate the building.

In some implementations, when the control signal 300 the control device(s) 260 provide the driver circuit 230 is adjusted, for instance, from 0V to 10V, the current splitter module 240 can adjust the ratio of the first current $I_1$ provided to the first light source 222 relative to the second current $I_2$ provided to the second light source 224. As a result, the amount of light emitted by the first light source 222 at a first color temperature can be adjusted relative to the amount of light emitted by the second light source 224 at a second color temperature, resulting in a different overall color temperature of the light output of the lighting fixture 210.

It should be appreciated, however, that the control device(s) 260 can be in direct communication with the current splitter module 240. In this manner, the control device(s) 260 can provide the control signal 300 directly to the current splitter module 240. In example embodiments, the current splitter module 240 can, based on the control signal 300, adjust the lumen output of the first light source 222 relative to the second light source 224.

In some implementations, the one or more control signals provided by the control device(s) 260 of the light fixture 210 can be associated with controlling operation of the audio input device(s) 252. More specifically, the one or more control signals can be associated with activating (e.g., turning on) the audio input device(s) 252 immediately after detection of an emergency. For instance, in response to detecting an emergency, the control device(s) 260 can activate the audio input device(s) 252 to collect audio data indicative of the emergency. In some implementations, the audio data can be streamed by one or more users at a remote location (e.g., not within the building or area). Alternatively or additionally, the audio data can be stored on one or more memory devices onboard the lighting fixture 210. In some implementations, an amount of time the audio input device(s) 252 collect audio data can vary depending on the type (e.g., active shooting, fire, medical, etc.) of emergency. For instance, the control device(s) 260 can be configured to activate the audio input device(s) 252 for a first amount of time during an active shooting. Conversely, the control device(s) 260 can be configured to activate the audio input device(s) 252 for a second amount of time during a fire. It should be appreciated that the first amount of time can be different relative to the second amount of time. For instance, the first amount of time can be longer relative to the second amount of time. In this manner, the amount of audio data collected during an active shooting can be greater compared to an amount of audio data collected during a fire.

In some implementations, the one or more control signals provided by the control device(s) 260 of the light fixture 210 can be associated with controlling operation of the image capture device(s) 254. More specifically, the one or more control signals can be associated with activating the image capture device(s) 254 immediately after detection of an emergency. For instance, in response to detecting an emergency, the control device(s) 260 can activate the image capture device(s) 254 to collect data indicative of the emergency. In some implementations, the data obtained via the image capture device(s) 254 can be streamed by one or more users at a remote location (e.g., not within the building or area). Alternatively or additionally, the data can be stored on one or more memory devices onboard the lighting fixture 210. In some implementations, an amount of time the image capture device(s) 254 collects data indicative of the emergency can vary depending on the type (e.g., active shooting, fire, medical, etc.) of emergency. For instance, the control device(s) 260 can be configured to activate the image capture device(s) 254 for a first amount of time during an active shooting. Conversely, the control device(s) 260 can be configured to activate the image capture device(s) 254 for a second amount of time during a fire. It should be appreciated that the first amount of time can be different relative to the second amount of time. For instance, the first amount of time can be longer relative to the second amount of time. In this manner, the amount of audio data collected during an active shooting can be greater compared to an amount of audio data collected during a fire.

In some implementations, the control device(s) 260 can control operation of a locking mechanism 290 (FIG. 1) associated with one or more doors within the building. Examples of the locking mechanism 290 can include, without limitation, a deadbolt lock. In some implementations, the control device(s) 260 can be configured to lock one or more doors within the building to restrict movement of an active gunman. Alternatively or additionally, the control device(s) 260 can unlock doors associated with a path one or more users within the building can traverse to safely evacuate the building.

In some implementations, the one or more control signals provided by the control device(s) 260 of the light fixture 210 can be associated with controlling operation of one or more security cameras 292 (FIG. 1) within the building. The security camera(s) 292 can include any camera (e.g., a video camera, a digital camera) that is separate from the lighting fixtures 210 and communicatively coupled to the control device(s) 260 via the network 280. More specifically, the one or more control signals can be associated with activating the security camera(s) 292 to obtain video data of an emergency occurring within the building. For instance, in response to detecting an emergency, the control device(s) 260 can activate the security camera(s) 292 to obtain video data indicative of the emergency occurring within the building. In some implementations, the video data obtained via the security camera(s) 292 can be streamed by one or more users at a remote location (e.g., not within the building or area). Alternatively or additionally, the video data can be stored on one or more memory devices onboard one or more of the lighting fixtures 210. In some implementations, an amount of time the security camera(s) 292 are activated to obtain data indicative of the emergency occurring within the building can vary depending on the type (e.g., active shooting, fire, medical, etc.) of emergency. For instance, the control device(s) 260 can be configured to activate the security camera(s) 292 for a first amount of time during an active shooting. Conversely, the control device(s) 260 can be configured to activate the security camera(s) 292 for a second amount of time during a fire. It should be appreciated that the first amount of time can be different relative to the second amount of time. For instance, the first amount of time can be longer relative to the second amount of time. In this manner, the amount of video data collected during an active shooting can be greater compared to an amount of video data collected during a fire.

In example embodiments, the control device(s) 260 can control operation of the image capture device(s) 254 and/or the security camera(s) 292 based, at least in part, on input received from one or more users within the building. For instance, in some implementations, a user can provide the input via an input device of an interactive panel associated with at least one of the lighting fixtures 210. In addition, the control device(s) 260 can be configured to verify an identify of the user providing the input prior to controlling operation of the image capture device(s) 254 and/or security camera(s) 292. For instance, identity of the user can be verified via a password, retinal scan, PIN, fingerprint scan, or any other suitable method.

Figure 6:
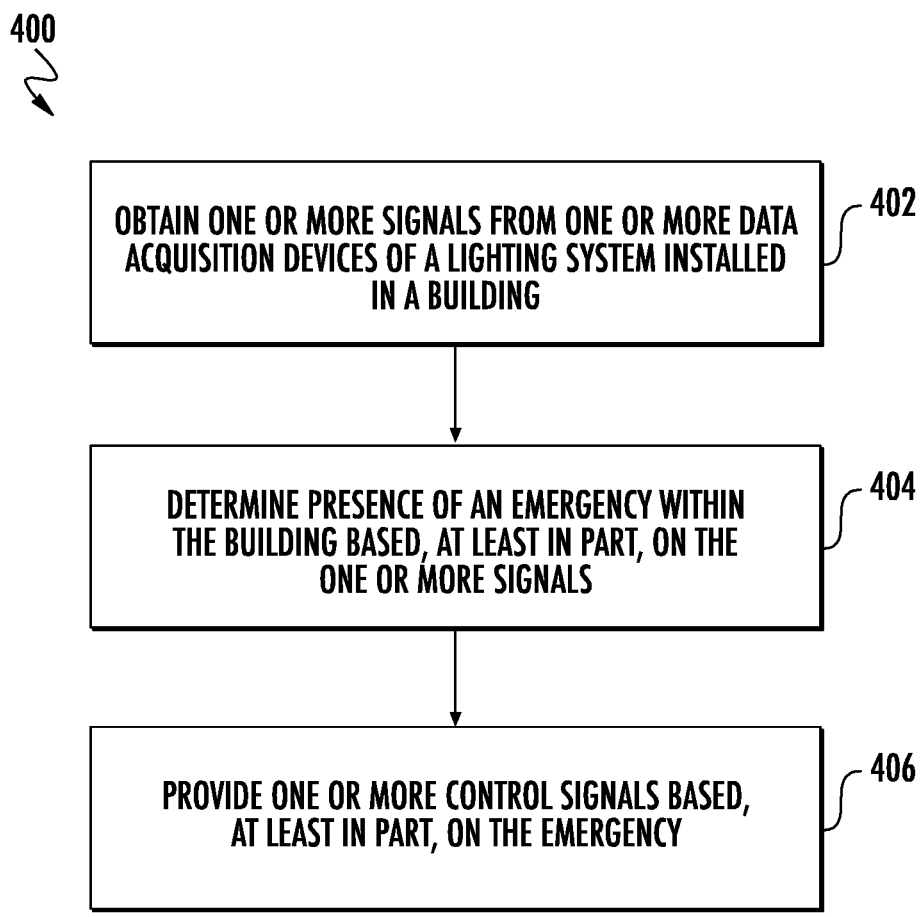
FIG. 6 depicts a flow diagram of a method for detecting an emergency according to example embodiments of the present disclosure.

Referring now to FIG. 6, a flow diagram of a method 400 for determining presence of an emergency within an environment (e.g., building) is provided according to example embodiments of the present disclosure. In general, the method 400 will be discussed herein with reference to the lighting system 200 described above with reference to FIGS. 1 through 5. Furthermore, although FIG. 6 depicts steps performed in a particular order for purposes of illustration and discussion, the method discussed herein is not limited to any particular order or arrangement. One skilled in the art, using the disclosure provided herein, will appreciate that various steps of the method disclosed herein can be omitted, rearranged, combined, and/or adapted in various ways without deviating from the scope of the present disclosure.

At (402), the method 400 includes obtaining data indicative of an emergency. More specifically, the data can be obtained from one or more data acquisition devices associated with the lighting fixtures installed in a room or area (e.g., hallway) of a building, such as a school or office complex. In some implementations, the data can be associated with audible sounds, infrared light or heat detected by the one or more data acquisition devices. For instance, one or more control devices can obtain data from one or more microphones of a lighting fixture disposed within an interior of the building. Alternatively or additionally, the one or more control devices can obtain data from a secondary sensor of the lighting fixture. For instance, the secondary sensor can include an image capture device of the lighting fixture. Alternatively or additionally, the secondary sensor can include any of the other data acquisition devices discussed above with reference to FIG. 4.

At (404), the method 400 includes determining occurrence of the emergency (e.g., active shooting) based, at least in part, on the data obtained at (402). In some implementations, one or more control devices of the lighting system can implement any suitable processing algorithm on the data obtained at (402). For instance, in this manner, the one or more control devices can determine whether the data obtained at (402) indicates the presence of an emergency. As one example, the emergency can include presence of a fire within the building. Alternatively or additionally, the emergency can include presence of a gunman within the building. It should be appreciated, however, that the audio data can indicate any suitable type of emergency.

In some implementations, the one or more control devices can process data obtained from one or more data acquisition devices at (402) to determine whether the data indicates presence of an emergency. For instance, the one or more control devices can be configured to compare one or more parameters (e.g., decibel level) of audio data obtained at (402). In some implementations, the one or more control devices can determine occurrence of an emergency when a decibel level of audible sounds associated with the audio data obtained at (402) exceeds (e.g., is greater than) one or more thresholds. For instance, audible sounds greater than the one or more thresholds can indicate discharge of a firearm. Alternatively or additionally, audible sounds greater than the one or more thresholds can indicate an audible noise being emitted from a fire alarm system associated with the building or area. It should be appreciated that the one or more thresholds can be associated with any suitable type of emergency.

In some implementations, the one or more control devices can be configured to compare audible sounds obtained at (402) against data indicative of audible sounds that are at least similar in some aspects (e.g., same decibel level) to sounds indicative of an emergency. For instance, the data indicative of audible sounds can, without limitation, include sounds indicative of a car backfiring, a firework exploding, or any other suitable sound that sounds the same or similar to a gunshot. In this manner, the one or more control devices can determine whether audio data obtained at (402) is indicative of a false positive.

It should be appreciated that the data indicative of audible sounds that the audio data obtained at (402) is compared against can be stored at any suitable location. For instance, in some implementations, the data indicative of the audible sounds can be stored on one or more memory devices associated with the lighting fixture. Alternatively or additionally, the data indicative of the audible sounds can be stored on one or more computing devices (e.g., server, cloud computing device, etc.) that are remote relative to the lighting fixtures. For instance, the one or more computing devices can be associated with a server that is remote relative to the building or area in which the lighting fixtures are located.

At (406), the method 400 includes providing one or more control signals based on the emergency. In some implementations, the one or more control signals can be associated with controlling a locking mechanism of one or more doors within the building. More specifically, the one or more control signals can be associated with locking or unlocking one or more doors based, at least in part, on the emergency. Alternatively or additionally, the one or more control signals can be associated with controlling operation of light sources onboard one or more lighting fixtures of the lighting system. For example, the second light source of one or more lighting fixtures positioned along a path the one or more users can traverse to evacuate the building can emit green light. Additionally, the first light source of one or more lighting fixtures that are not positioned along the path can emit red light. In this manner, the lighting system can provide visual cues (e.g., red light, green light) that can assist the one or more persons in evacuating the building or area during the emergency.

In some implementations, the one or more control signals provided at (406) can be associated with providing a notification (e.g., email, text message, phone call, etc.) indicative of the emergency to emergency personnel, first responders, building staff, people within the building or anyone else to whom the knowledge of the emergency could be valuable. In some implementations, the notification can indicate the type (e.g., fire, active shooter, medical) of the emergency or any other suitable parameter associated with the emergency. In some embodiments, the one or more control devices can be configured to provide the notification to one or more users included in a notification tree associated with the building or area.

In some implementations, the notification can include data indicative of a virtual map of the building or area. For instance, the virtual map can indicate a layout (e.g., floorplan) of at least a portion of the building or area. In some implementations, the virtual map can indicate a current location of the emergency based, at least in part, on data obtained from the one or more data acquisition devices associated with the lighting fixtures of the lighting system. The virtual map can be updated in real-time or near real-time based, at least in part, on the data obtained from the one or more data acquisition devices to indicative movement (e.g., a change in location) of the emergency. In this manner, the emergency personnel responding to emergency can be notified of a change in the location of the emergency. Alternatively or additionally, the virtual map can recommend a path for emergency personnel to traverse to respond to the emergency. In this manner, the notification can aide emergency personnel in responding to the emergency.

Referring briefly now to FIGS. 7 and 8, the switch 110 of the lighting system 200 (FIG. 1) can include a contact 112 movable between a first position 114 (FIG. 8) and a second position 116 (FIG. 9). When the contact 112 is in the first position 114, the data acquisition device(s) 250 can receive electrical power from the power supply 100. However, the light source(s) 220 cannot receive electrical power from the power supply 100 when the contact 112 is in the first position. Conversely, when the contact 112 is in the second position 116, both the light source(s) 220 and the data acquisition device(s) 250 can receive electrical power form the power supply 100. In this manner, the data acquisition device(s) 250 can receive a continuous supply of electrical power from the power supply 100 regardless of the position (e.g., first position 114, second position 116) of the contact 112.

Referring now to FIG. 9, a plan view of an example building 500 is provided according to example embodiments of the present disclosure. The building 500 defines a lateral direction L and a transverse direction T. As shown, the building 500 extends along the lateral direction L between a front portion 502 and a rear portion 504. Additionally, the building 500 extends along the transverse direction T between a first side 506 and a second side 508. The building 500 includes a first entrance 510 and a second entrance 512. It should be appreciated, however, that the building 500 can include more or fewer entrances. As shown, the first entrance 510 is positioned at the front portion 502 of the building 500, whereas the second entrance 512 is positioned at the rear portion 504 of the building 500. It should be appreciated that the interior of the building 500 can be accessed via the first entrance 510 and the second entrance 512.

In some implementations, the interior of the building 500 includes a plurality of rooms 520, 522, 524, 526, 528. It should be appreciated that each room of the plurality of rooms 520, 522, 524, 526, 528 is accessible via a door 530 that is movable between a first position and a second position. When the door 530 is in the first position, one or more persons can enter or exit the rooms 520, 522, 524, 526, 528. When the door 530 is in the second position, one or more persons cannot enter or exit the rooms 520, 522, 524, 526, 528. In some implementations, the door 530 can include the locking mechanism 290 (FIG. 1). In this manner, the locking mechanism 290 can be configured to secure the door 530 in the second position.

In some implementations, the interior of the building 500 includes a first hallway 540, a second hallway 542, and a third hallway 544 that joins the first hallway 540 with the second hallway 542. As shown, lighting fixtures 210 of the lighting system 200 discussed above with reference to FIG. 1 can be installed in the interior of the building 500. More specifically, at least one of the lighting fixtures 210 can be installed in each of the plurality of rooms 520, 522, 524, 526, 528. Additionally, lighting fixtures 210 can be installed in the hallways 540, 542, 544. In this manner, lighting fixtures 210 can be positioned throughout the interior of the building 500.

In some implementations, the lighting system 200 can be used to detect presence of an emergency within the interior of the building 500. More specifically, the audio input device(s) 252 (FIG. 4) onboard at least one of the lighting fixtures 210 can detect audible sounds indicative of an emergency. As discussed above, the control device(s) 260 (FIG. 2) can process data indicative of the audible sounds detected by the audio input device(s) 252. In this manner, the control device(s) 260 can determine whether the audible sounds detected by the audio input device(s) 252 are, in fact, indicative of an emergency, such as a fire or gunman. If the control device(s) 260 determine the audible sounds indicate the presence of an emergency within the interior of the building 500, the control device(s 260 can, as discussed above, provide one or more control signals to assist one or more persons present within the interior of the building 500. For instance, the control device(s) 260 can provide one or more control signals associated with controlling operation of the first light source 222 (FIG. 3) and the second light source 224 (FIG. 3) onboard each of the lighting fixtures 210. More specifically, the control device(s) 260 can issue a command to illuminate the second light source 224 onboard each of the lighting fixtures 210 that are positioned along a path the one or more persons can traverse to evacuate the building 500. Additionally, the control device(s) 260 can issue a command to illuminate the first light source 222 onboard each of the lighting fixtures 210 that are not positioned along the path. In this manner, the lighting system 200 can provide visual cues (e.g., red light, green light) to assist the one or more persons evacuating the building 500 during the emergency.

It should be appreciated that the building 500 can be used for any intended purpose. For instance, the building 500 can be a school (e.g., elementary, middle, high school, college). Alternatively, the building 500 can be an office complex. It should also be appreciated that the floor plan depicted in FIG. 9 is only intended to be an example of a building. As such, modifications to the floor plan are within the scope of the present disclosure.

Referring now to FIG. 10, a block diagram of components of an emergency notification system 600 for a building, such as the building depicted in FIG. 9, is provided according to example embodiments of the present disclosure. As shown, the emergency notification system 600 can include one or more input devices 610. It should be appreciated that the one or more input devices 610 can be mounted throughout the building. For example, the one or more input devices 610 can be provided within a room of the building. Alternatively or additionally, the one or more input devices 610 can be provided within a common area (e.g., hallway) of the building. As will be discussed below in more detail, that the one or more input devices 610 can be configured to receive a manual user-input indicative of an emergency occurring within the building.

In some implementations, the manual user-input can include any suitable type of touch-based interaction between a user and the one or more input devices 610. It should be understood that touch-based interactions require the user to contact (e.g., touch) the one or more input devices 610 to provide the manual user-input. In some implementations, the manual user-input can include any suitable type of touchless interaction (e.g., voice, hand-gesture, etc.) between a user and the one or more input devices 610. It should be understood that touchless interactions do not require the user to contact (e.g., touch) the one or more input devices 610 to provide the manual user-input. In some implementations, energy associated with each touch-based interaction can be used to power the corresponding input device 610.

As shown, the emergency notification system 600 can include one or more output devices 620. The one or more output devices 620 can be mounted throughout the building. For example, one or more output devices 620 can be provided within each room of the building. Alternatively and/or additionally, one or more output devices 620 can be provided within a common area (e.g., hallway) of the building. It should be appreciated that the one or more output devices 620 can be separate from one or more lighting fixtures located within the building and configured to illuminate an interior of the building. As will be discussed below in more detail, the one or more output devices 620 can include a plurality of LED arrays, and each of the plurality of LED arrays can be configured to emit light of a different color (e.g., red, green, blue, white) to provide visual cues indicative of a type of emergency (e.g., fire, active shooter, medical trauma) occurring within the building.

In some implementations, the emergency notification system 600 can include one or more control devices 630. It should be appreciated that the one or more control devices 630 can be located at any suitable location within the building. For instance, the one or more control devices 630 can be located in a maintenance room of the building. Alternatively and/or additionally, the one or more control devices 630 can be located within a ceiling of the maintenance room. It should be appreciated that the emergency notification system 600 can include any suitable number of control devices 630. For instance, in some implementations, each floor of a multi-story building in which the emergency notification system is installed can be equipped with one or more control devices 630. In some implementations, the one or more control device 630 can be located on one of the output devices 620 of the emergency notification system 600. In this manner, the control device 630 can process the data without requiring an internet connection.

In some implementations, the one or more control devices 630 can receive alternating current (AC) power from a mains power supply for the building. Additionally and/or alternatively, the one or more control devices 630 can receive direct current (DC) power from a battery device. In example embodiments, the battery device can be used to power the one or more control devices 630 when the mains power supply is inoperable due to, for instance, a power outage. In this manner, the one or more control devices 630 can operate during the power outage.

In example embodiments, the one or more control devices 630 can provide electrical power to the one or more input devices 610. For example, the one or more control devices 630 can provide DC power to the one or more output devices 620. Alternatively and/or additionally, the one or more control devices 630 can provide electrical power to the one or more output devices 620. For instance, the one or more control devices 630 can provide DC power to the one or more output devices 620 at any suitable voltage. It should be appreciated that the one or more control devices 630 can provide DC power to the one or more input device 610, the one or more output devices 620, or both at any suitable voltage. For instance, the control device 630 can provide 48 VDC to the one or more input devices 610, the one or more output devices 620, or both.

In some implementations, the one or more control devices 630 can be in communication with the one or more input devices 610, the one or more output devices 620, or both over a network. In this manner, the one or more control devices 630 can receive data from the one or more input devices 610 via the network. More specifically, the data can be indicative of the manual user-input received at the one or more input devices 610. Additionally, the data can include a unique identifier associated with the input device 610 receiving the manual user-input. As will be discussed below in more detail, the control device 630 can be configured to determine a location of the emergency based, at least in part, on the unique identifier associated with the input device 610 receiving the manual user-input.

Examples of the network can include, without limitation, a Power-Over-Ethernet (POE) network, a local area network (e.g., intranet), a wide area network (e.g., internet), a low power wireless network (e.g., Bluetooth Low Energy (BLE), Zigbee, etc.), or some combination thereof and can include any number of wired or wireless links. In general, communication over the network can be implemented via any type of wired or wireless connection, using a wide variety of communication protocols, encodings or formats, and/or protection schemes.

Example communication technologies used in accordance with example aspects of the present disclosure can include, for instance, Bluetooth low energy, Bluetooth mesh networking, near-field communication, Thread, TLS (Transport Layer Security), Wi-Fi (e.g., IEEE, 802.11), Wi-Fi Direct (for peer-to-peer communication), Z-Wave, Zigbee, Halow, cellular communication, LTE, low-power wide area networking, VSAT, Ethernet, MoCA (Multimedia over Coax Alliance), PLC (Power-line communication), DLT (digital line transmission), Power over Ethernet, etc. Other suitable wired and/or wireless communication technologies can be used without deviating from the scope of the present disclosure.

In example embodiments, the one or more control devices 630 can be in communication with an existing building automation system for the building. It should be appreciated that the one or more control devices 630 can be in communication with the building automation system using any suitable communication protocol. For instance, in some implementations, the one or more control devices 630 can communicate with the building automation system via the BACnet protocol. Alternatively and/or additionally, the one or more control devices 630 can be in communication with an exterior lighting system for the building. In this manner, the one or more control device 630 can provide notifications indicative of the emergency occurring within the building to the building automating system and/or the exterior lighting system.

In some implementations, the one or more control devices 630 can be configured to provide notifications indicative of the emergency occurring within the building to one or more persons included in a notification tree. For example, emergency personnel (e.g., police, fire, medical) can be included in the notification tree. Alternatively or additionally, security personnel for the building can be included in the notification tree. It should be appreciated, however, that any suitable person can be included in the notification tree. For example, if the building is a multi-premises building, tenants of the multi-premises building can be included in the notification tree.

In some implementations, the one or more control device 630 can be configured to provide a notification (e.g., phone call, text message, e-mail, etc.) to emergency personnel (e.g., police dept., EMTs, fire dept.). Alternatively and/or additionally, the one or more control devices 630 can be configured to provide a notification to local security for the building. For instance, the one or more control devices 630 can be configured to email an account associated with the local security. Alternatively and/or additionally, the control device 630 can be configured to call a phone number associated with the local security and provide a pre-recorded message indicative of the emergency. In this manner, multiple people can receive notifications indicative of the emergency occurring within the building.

In some implementations, the emergency notification system 600 can include one or more display devices 640 having display screen. It should be appreciated that the one or more display devices 640 can include any suitable type of display screen. For instance, in some implementations the one or more display devices 640 can include a liquid crystal diode (LCD) display. In example embodiments, the one or more display devices 640 can be located within a common area of the building. For instance, the one or more display devices 640 can be located near an elevator bay and/or stairwell of the building. It should be appreciated, however, that the one or more display devices 640 can be located at any suitable location within the building.

In some implementations, the one or more control devices 630 can provide one or more notifications indicative of the emergency occurring within the building to the one or more display devices 640. In this manner, the one or more notifications can be displayed on the display screens of the one or more or more display devices 640. In some implementations, the one or more notifications provided to the one or more display devices 640 can indicate a location (e.g., floor and/or room) of the emergency occurring within the building. Furthermore, in some implementations the one or more notifications provided to the one or more display devices 640 can include directions for emergency personnel responding to the emergency. More specifically, the one or more notifications displayed on the display screen of the one or more display devices 640 can be a map of the building and can indicate a path emergency personal can traverse to respond to the emergency. In this manner, the one or more notifications displayed on the display screen of the one or more display devices 640 can improve response time of emergency personnel responding to the emergency. In some implementations, the one or more control devices 630 can be configured to provide one or more notifications to the one or more display devices 640 in real-time or near real-time. In this manner, the notifications can be updated in real-time or near real-time to indicate a state (e.g., ongoing, all clear, etc.) of the emergency.

Referring now to FIG. 11, the one or more output devices 620 can include a housing 710 configured to accommodate one or more components thereof. It should be appreciated that the housing 710 can be formed from of any suitable material. For instance, in some implementations the housing 710 can be formed from a plastic material (e.g., polyurethane). In example embodiments, the one or more output devices 620 can include one or more audio output devices (e.g., speakers) 720 configured to emit audible sounds indicative of the emergency occurring within the building. It should be appreciated that the audible sounds can be emitted at a frequency that does not interfere with audible sounds emitted by existing alarm systems (e.g., fire alarm system, security system, etc.). In example embodiments, the audible sounds can include a pre-recorded voice message indicative of the type of emergency occurring within the building. Furthermore, in some implementations, the pre-recorded voice message can include instructions based, at least in part, on the type of emergency. For example, the pre-recorded voice message can instruct persons to lockdown the building when the emergency involves an active shooter.

In some implementations, the one or more output devices 620 can include a communication circuit 730. The communications circuit 730 can include associated electronic circuitry that can be used to communicatively couple the one or more output devices 620 with the one or more input devices 610, the one or more control devices 630, or both. Alternatively or additionally, the communication circuit 730 can be configured to allow the one or more output devices 620 to communication with one another over the network.

In some implementations, the one or more output devices 620 can include a driver circuit 740 configured to receive an input power (e.g., AC input power or DC input power) from the one or more control devices 630 (FIG. 11) and convert the input power to a driver output (e.g., driver current) suitable for powering the plurality of LED arrays 750 of the one or more output devices 620. The driver circuit 740 can include various components, such as switching elements (e.g., transistors). Gate timing commands can be provided to the one or more switching elements to convert the input power to the driver output. In this manner, the driver circuit 740 can provide the driver output to the plurality of LED arrays 750.

In some implementations, the one or more output devices 620 can include one or more control devices 760. The one or more control devices 760 can be configured to provide one or more control signals to the driver circuit 740 to adjust operation of the plurality of LED arrays 750. As will be discussed below in more detail, operation of the plurality of LED arrays 750 can be controlled to provide visual cues indicative of the type of emergency occurring within the building.

Referring now to FIG. 12, the plurality of LED arrays 750 can include a first LED array 752, a second LED array 754, a third LED array 756, and a fourth LED array 758. It should be appreciated, however, that the one or more output devices 620 can include more or fewer LED arrays. As will be discussed below, the first LED array 752, second LED array 754, and third LED array 756 can each be configured to emit light of a different color (e.g., red, green, blue) to indicate a different type of emergency occurring within the building.

The first LED array 752 can be configured to emit light of a first color (e.g., red light) to indicate a first type of emergency (e.g., fire) occurring within the building. In addition, the second LED array 754 can be configured to emit light of a second color (e.g., green) that is different than the first color. The second color can be indicative of a second type of emergency (e.g., medical) occurring within the building that is different than the first type. The third LED array 756 can be configured to emit light of a third color (e.g., blue) that is different than the first color and the second color. Furthermore, the third color can indicate a third type of emergency occurring within the building that is different than the first type and the second type. In some implementations, the fourth LED array 758 can be configured to emit light of a fourth color (e.g., white) that is different than each of the first color, the second color, and the third color. Furthermore, the fourth color can indicate a maintenance action needs to be performed on the emergency notification system 600 (FIG. 10).

In some implementations, the one or more control devices 630 (FIG. 10) of the emergency notification system 600 can determine a type of emergency (e.g., fire, medical, police) occurring within the building based, at least in part, on manual user-input received via the one or more input devices 610. As will be discussed below in more detail, the one or more control devices 630 can provide one or more control signals associated with activating one of the plurality of LED arrays 750 based on the type of emergency occurring within the building. In this manner, the activated LED array of the one or more output devices 620 can indicate the type of emergency occurring within the building.

For example, the one or more control devices 630 can be configured to provide one or more control signals associated with activating the first LED array 752 of the one or more output devices 620 (FIG. 10) in response to determining the type of emergency occurring within the building corresponds to the first type (e.g., fire). In this manner, the first LED array 752 of the one or more output devices 620 can emit light of the first color (e.g., red) to indicate the emergency occurring within the building is of the first type. As another example, the one or more control devices 630 can be configured to provide one or more control signals associated with activating the second LED array 754 of the one or more output devices 620 in response to determining the type of emergency occurring within the building corresponds to the second type (e.g., medical). In this manner, the second LED array 754 can emit light of the second color to indicate the emergency occurring within the building is of the second type. As yet another example, the one or more control devices 630 can be configured to provide one or more control signals associated with activating the third LED array 756 of the one or more output devices 620 in response to determining the type of emergency occurring within the building corresponds to the third type (e.g., police). In this manner, the third LED array 756 can emit light of the third color to indicate the emergency occurring within the building is of the third type.

In some implementations, the one or more input devices 610 can include a plurality of indicators to indicate which of the plurality of LED arrays 750 is activated. It should be appreciated that the plurality of indicators can include any suitable type of audible indicator or visual indicator. For instance, the one or more input devices 610 can include a first indicator light, a second indicator light, and a third indicator light. It should be appreciated, however, that the one or more input devices 610 can include more or fewer indicator lights.

In some implementations, the first indicator light can be configured to emit light of a first color (e.g., red) to indicate the first LED array 752 of the one or more output devices 620 is activated. The second LED indicator light can be configured to emit light of a second color (e.g., green) that is different than the first color to indicate the second LED array 754 of the one or more output devices 620 is activated. The third indicator light can be configured to emit light of a third color (e.g., blue) that is different than the first color and the second color to indicate the third LED array 756 of the one or more output devices 620 is activated.

In some implementations, each of the LED arrays 750 can emit light at different frequencies. For instance, the one or more control devices 630 can provide one or more control signals associated with activating the first LED array 752 to emit light at a first frequency such that the light emitted from the first LED array 752 blinks according to a first predefined pattern or rate. In addition, the one or more control devices 630 can provide one or more control signals associated with activating the second LED array 754 to emit light at a second frequency that is different than the first frequency such that the light emitted from the second LED array 754 blinks according to a second predefined pattern or rate that is different than the first pattern or rate. Furthermore, the one or more control devices 630 can be configured to provide one or more control signals associated with activating the third LED array 756 to emit light at a third frequency that is different than the first frequency and the second frequency such that the light emitted from the third LED array 756 blinks according to a third predefined pattern or rate that is different than the first pattern or rate and the second pattern or rate. In this manner, one or more persons that are color-blind and within the building can determine the type of emergency occurring within the building based, at least in part, on the blinking pattern of the activated LED array.

In some implementations, the one or more control devices 630 can provide one or more control signals associated with activating the fourth LED array 758 of the one or more output devices 620 to indicate a maintenance action needs to be performed on the emergency notification system 600. For instance, the one or more control devices 630 can activate the fourth LED array 758 on one of the output devices 620 in response to determining one of the LED arrays 750 on the output devices 620 needs to be replaced. It should be appreciated, however, that the one or more control devices 630 can be configured to activate the fourth LED array 758 on one of the output devices 620 to indicate any suitable maintenance action that needs to be performed on the output devices 620.

FIG. 13 illustrates one embodiment of suitable components of the control device 630, 760. As shown, the control device 630, 760 can include at least one processor 632 configured to perform a variety of computer-implemented functions (e.g., performing the methods, steps, calculations and the like disclosed herein). As used herein, the term "processor" refers not only to integrated circuits referred to in the art as being included in a computer, but also refers to a controller, microcontroller, a microcomputer, a programmable logic controller (PLC), an application specific integrated circuit (ASIC), a Field Programmable Gate Array (FPGA), and other programmable circuits.

In addition, the control device 630, 760 can include a memory device 634. Examples of the memory device 634 can include computer-readable media including, but not limited to, non-transitory computer-readable media, such as RAM, ROM, hard drives, flash drives, or other suitable memory devices. The memory device 634 can store information accessible by the processor(s) 632, including computer-readable instructions 636 that can be executed by the processor(s) 632. The computer-readable instructions 636 can be any set of instructions that, when executed by the processor(s), cause the processor(s) 632 to perform operations. The computer-readable instructions 636 can be software written in any suitable programming language or can be implemented in hardware. In some example embodiments, the computer-readable instructions 636 can be executed by the control device 630, 760 to perform operations, such as providing one or more control signals to control operation of the display device 640 (FIG. 11). Alternatively and/or additionally, the computer-readable instructions 636 can be executed by the control device 630 to provide notifications to a building automation system for the building and/or exterior lighting system for the building.

The memory device 634 can further store data 638 that can be accessed by the control device 630. In example embodiments, the data 638 can include a look-up table comprising a unique identifier associated with each input device 610 (FIG. 10) of the emergency notification system 600 (FIG. 10). In this manner, the control device 630 can determine a location of the emergency based, at least in part, on the unique identifier associated with the input device 610 used to activate/deactivate the emergency notification system 600 (FIG. 10).

FIG. 14 is a flow diagram of a method 800 for controlling operation of an emergency notification system according to example embodiments of the present disclosure. In general, the method 400 will be discussed herein with reference to the emergency notification system 600 described above with reference to FIGS. 10 through 13. Furthermore, although FIG. 14 depicts steps performed in a particular order for purposes of illustration and discussion, the method discussed herein is not limited to any particular order or arrangement. One skilled in the art, using the disclosure provided herein, will appreciate that various steps of the method disclosed herein can be omitted, rearranged, combined, and/or adapted in various ways without deviating from the scope of the present disclosure.

At (802), the method 800 includes obtaining, via an input device of the emergency notification system, user-input indicative of a type of emergency occurring within the building. For instance, the user-input can indicate the type of emergency occurring within the building is a fire emergency, a medical emergency, or a police emergency. In some implementations, a user can interact with a touch-based input device of the notification system to provide the user-input. Alternatively, the user can interact with a touch-free input device of the notification system to provide the user-input. In response to obtaining the user-input at (802), the method 800 proceeds to (804).

At (804), the method 800 includes determining, by one or more control devices, a type of emergency occurring within the building based, at least in part, on the manual user-input received at (802). In example embodiments, the one or more control devices can be configured to determine the type of emergency occurring within the building based, at least in part, on the touch or touch-free interaction a user has with the one or more input devices to provide the manual user-input.

In some implementations, the one or more input devices can include a plurality of buttons. Each of the plurality of buttons can correspond to a different type of emergency. In such implementations, the one or more control devices can be configured to determine the type of emergency occurring within the building based on which button the user pressed to provide the manual user-input. It should be appreciated that the one or more input devices can include any suitable type of device that a user can contact (e.g., touch) to provide the manual user-input.

In some implementations, the one or more input devices can include one or more microphones configured to obtain audio data. In this manner, the audio data can be indicative of one or more words (e.g., "Fire", "Shooter", etc.) spoken by the user to indicate the type of emergency occurring within the building. In such implementations, the one or more control devices can be configured to process the audio data to determine the type of emergency occurring within the building. It should be appreciated that the one or more input devices can include any suitable type of device that can be used to detect the manual user-input without requiring the user to contact (e.g., touch) the one or more input devices.

At (806), the method 800 includes providing, by one or more control devices, one or more control signals associated with activating an LED array of the plurality of LED arrays on one or more output devices of the emergency notification system to emit light indicative of the type of emergency occurring within the building.

For example, the one or more control devices can be configured to provide one or more control signals associated with activating the first LED array of the one or more output devices in response to determining the type of emergency occurring within the building corresponds to the first type (e.g., fire). In this manner, the first LED array of the one or more output devices can emit light of the first color (e.g., red) to indicate the emergency occurring within the building is of the first type. As another example, the one or more control devices can be configured to provide one or more control signals associated with activating the second LED array of the one or more output devices in response to determining the type of emergency occurring within the building corresponds to the second type (e.g., medical). In this manner, the second LED array can emit light of the second color to indicate the emergency occurring within the building is of the second type. As yet another example, the one or more control devices can be configured to provide one or more control signals associated with activating the third LED array of the one or more output devices in response to determining the type of emergency occurring within the building corresponds to the third type (e.g., police). In this manner, the third LED array can emit light of the third color to indicate the emergency occurring within the building is of the third type.

At (808), the method 800 can, in response to determining the type of emergency at (804) providing, by one or more control devices, an audible notification indicative of the emergency via one or more audio output devices (e.g., speakers) of the one or more output devices. In some implementations, the audible notification can be an audible sound indicative of the type of emergency occurring within the building. It should be appreciated that a harmonic of the audible sound emitted from the one or more audio output devices can be different compared to the harmonic of audible sounds emitted from existing alarm systems (e.g., fire alarm system, security system, etc.). In this manner, the audible sound emitted from the one or more audio output devices can be heard along with the audible sounds emitted from the existing alarm systems.

In some implementations, the audible notification can include a pre-recorded message indicative of the type of emergency. For example, the one or more audio output devices can emit a first pre-recorded message indicative of a first type of emergency (e.g., fire) when the one or more control devices determine the manual user-input obtained at (802) indicates the first type of emergency is occurring within the building. As another example, the one or more audio output devices can emit a second pre-recorded message indicative of a second type of emergency (e.g., medical) when the one or more control devices determine the manual user-input obtained at (802) indicates the second type of emergency is occurring within the building. As yet another example, the one or more audio output devices (e.g., speakers) can emit a third pre-recorded message indicative of a third type of emergency (e.g., medical) when the one or more control devices determine the manual user-input obtained at (802) indicates third type of emergency is occurring within the building.

At (810), the method 800 can include providing, by one or more control devices, a notification to display on a display screen of one or more display devices of the emergency notification system. In some implementations, the notification can be indicative of a location of the emergency occurring within the building. For instance, the notification can indicate a floor on which the emergency is occurring when the building is a multi-floor building. Alternatively or additionally, the notification can indicate a room in which the emergency is occurring. In some implementations, the notification provided for display on the display screen of the one or more display devices can be a map of the building and can indicate a path emergency personal can traverse to respond to the emergency. In this manner, the notification displayed on the display screen of the one or more display devices can improve response time of emergency personnel responding to the emergency At (812), the method 800 can include providing, by one or more control devices, a notification to one or more persons included in a notification tree. For example, emergency personnel (e.g., police, fire, medical) can be included in the notification tree. Alternatively or additionally, security personnel for the building can be included in the notification tree. It should be appreciated, however, that any suitable person can be included in the notification tree. For example, if the building is a multi-premises building, tenants of the multi-premises building can be included in the notification tree.

In some implementations, the method 800 can include obtaining, via the input device of the emergency notification, manual user-input to indicate the emergency is no longer occurring within the building. For example, a user can provide the manual user-input to indicate the emergency is no longer occurring via a touch-based interaction with the one or more input devices. For instance, the user can provide the manual user-input to indicate the emergency is no longer occurring by pressing a button on the one or more input devices that was previously pressed at (802) to indicate the emergency was occurring within the building. As another example, a user can provide the manual user-input to indicate the emergency is no longer occurring via a touch-free interaction with the one or more input devices. For instance, the user can provide the manual user-input to indicate the emergency is no longer occurring by saying one or more trigger words (e.g., "All Clear") to indicate the emergency is no longer occurring.

In some implementations, the method 800 can further include determining, by the one or more control devices, the emergency is no longer occurring based, at least in part, on the manual user-input provided to indicate the emergency is no longer occurring within the building. Furthermore, in response to receiving the user-input at (812), the method 800 can include providing, by the one or more control devices, one or more control signals associated with deactivating the LED array activated at (806) such that the LED array no longer emits light.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. An emergency notification system for a building, the emergency notification system comprising:
    one or more lighting fixtures positioned in the building and configured to illuminate an interior of the building, the one or more lighting fixtures including a data acquisition device;
    one or more input devices positioned in the building, the one or more input devices configured to receive a manual user-input;
    one or more output devices positioned in the building; and
    one or more control devices configured to perform operations comprising,
        processing data received from the one or more data acquisition devices,
        determining a type of emergency occurring within the building based, at least in part, on the manual user-input, and
        responsive to determining the type of emergency, activating the output device to produce a signal indicative of the type of emergency occurring within the building and controlling the light output of a plurality of the one or more light fixtures to provide visual cues to assist in evacuating the building.

2. The emergency notification system of claim 1, wherein the one or more output devices are separate from the one or more lighting fixtures.

3. The emergency notification system of claim 1, wherein at least one of the one or more output devices comprises,
    a first LED array configured to emit light of a first color to indicate a first type of emergency,
    a second LED array configured to emit light of a second color that is different than the first color and indicative of a second type of emergency that is different than the first type of emergency, and
    a third LED array configured to emit light of a third color that is different than the first color and the second color and is indicative of a third type of emergency that is different than the first type of emergency and the second type of emergency.

4. The emergency notification system of claim 3, wherein,
    the first type of emergency corresponds to a fire emergency,
    the second type of emergency corresponds to a medical emergency, and
    the third type of emergency corresponds to a police emergency.

5. The emergency notification system of claim 3, wherein the one or more output devices further comprise a fourth LED array configured to emit light of a fourth color to indicate a maintenance action needs to be performed on the emergency notification system.

6. The emergency notification system of claim 1, wherein the one or more output devices comprises one or more audio output devices.

7. The emergency notification system of claim 1, wherein the one or more output devices are connected to a Power-Over-Ethernet network.

8. The emergency notification system of claim 1, wherein the manual user-input comprises a voice interaction with the one or more input devices.

9. The emergency notification system of claim 1, further comprising,
    one or more display devices comprising a display screen configured to display a notification indicative of a location of the emergency occurring within the building.

10. The emergency notification system of claim 9, wherein the operations further comprise,
    determining a location of the emergency occurring within the building based, at least in part, on the manual user-input, and
    responsive to determining the location of the emergency, providing the notification indicative of the location of the emergency for display on the display screen of the one or more display devices.

11. The emergency notification system of claim 1, wherein the one or more input devices comprises a plurality of indicators, each of the indicators indicative of a different type of emergency.

12. The emergency notification system of claim 11, wherein the plurality of indicators comprises at least one of a visual indicator and an audible indicator.

13. The emergency notification system of claim 1, wherein the data acquisition device includes at least one of an audio input device, an image capturing devices, or a heat sensor.

14. The emergency notification system of claim 1, wherein the operations further comprise selectively activating the output devices to provide cues to assist with the evacuation of the building.

15. A method of controlling operation of an emergency notification system for a building, the method comprising:
obtaining a manual user-input via one or more input devices of an emergency notification system for a building;
obtaining data from a data acquisition device incorporated in a light fixture;
determining, by one or more control devices, a type of emergency occurring within the building based, at least in part, on the manual user-input and the obtained data; and
responsive to determining the type of emergency, activating, by one or more control devices, a plurality of output devices of the emergency notification system,
wherein the output devices are selectively activated to provide cues to assist with the evacuation of the building based on the emergency occurring within the building, and
wherein the cues include emitting light to provide a first signal from at least a first output devices and emitting light to provide a second signal from at least a second output device, the second signal being different from the first signal.

16. The method of claim 15, wherein selectively activating the output devices includes activating an LED array such that the LED array emits light according to a predefined pattern indicative of the type of emergency occurring within the building.

17. The method of claim 15, further comprising,
determining, by the one or more control devices, a location of the emergency based, at least in part, the manual user-input, and
providing, by the one or more control devices, a notification indicative of the location of the emergency to display on a display screen of one or more display devices of the emergency notification system.

18. The method of claim 15, further comprising,
responsive to determining the type of emergency, providing a notification indicative of the emergency to one or more persons included in a notification tree.

19. The method of claim 15, further comprising,
responsive to determining the type of emergency, providing, by the one or more control devices, an audible notification via one or more audio output devices of the one or more output devices, the audible notification indicative of the type of emergency occurring within the building.

20. The method of claim 19, wherein the audible notification comprises a pre-recorded message indicative of the type of emergency occurring within the building.

* * * * *